US010197772B2

(12) United States Patent
Chen et al.

(10) Patent No.: US 10,197,772 B2
(45) Date of Patent: Feb. 5, 2019

(54) OPTICAL PHOTOGRAPHING LENS SYSTEM, IMAGE CAPTURING UNIT AND ELECTRONIC DEVICE

(71) Applicant: LARGAN Precision Co., Ltd., Taichung (TW)

(72) Inventors: Chun-Yen Chen, Taichung (TW); Shu-Yun Yang, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 0 days.

(21) Appl. No.: 15/484,333

(22) Filed: Apr. 11, 2017

(65) Prior Publication Data

US 2018/0143404 A1 May 24, 2018

(30) Foreign Application Priority Data

Nov. 24, 2016 (TW) .............................. 105138725 A

(51) Int. Cl.
| *G02B 13/18* | (2006.01) |
| *G02B 3/02* | (2006.01) |
| *G02B 9/60* | (2006.01) |
| *G02B 13/00* | (2006.01) |
| *G02B 13/04* | (2006.01) |
| *B60R 11/04* | (2006.01) |

(52) U.S. Cl.
CPC .......... *G02B 13/0045* (2013.01); *G02B 9/60* (2013.01); *G02B 13/04* (2013.01); *B60R 11/04* (2013.01)

(58) Field of Classification Search
CPC ....... G02B 9/60; G02B 13/04; G02B 13/0045
USPC .................. 359/714, 753, 763, 770
See application file for complete search history.

(56) References Cited

U.S. PATENT DOCUMENTS

| 4,232,943 A | 11/1980 | Rogers |
| 4,682,862 A | 7/1987 | Moskovich |
| 5,418,647 A | 5/1995 | Ishisaka |
| 5,448,319 A | 9/1995 | Uzawa |
| 8,456,758 B1 | 6/2013 | Huang et al. |
| 8,605,368 B2 | 12/2013 | Tsai et al. |
| 8,693,108 B2 | 4/2014 | Liao et al. |
| 8,705,182 B1 | 4/2014 | Chen et al. |
| 8,763,977 B2 | 5/2014 | Tang et al. |
| 9,036,269 B2 | 5/2015 | Yamakawa et al. |
| 9,086,559 B2 | 7/2015 | Huang |
| 9,223,114 B2 | 12/2015 | Tsai et al. |

(Continued)

FOREIGN PATENT DOCUMENTS

| JP | 04321006 | 11/1992 |
| JP | 07151981 | 6/1995 |

(Continued)

*Primary Examiner* — William Choi

(74) *Attorney, Agent, or Firm* — Hanley, Flight & Zimmerman, LLC

(57) ABSTRACT

An optical photographing lens system, includes, in order from an object side to an image side, a first lens element, a second lens element, a third lens element, a fourth lens element and a fifth lens element. The second lens element has an object-side surface being concave in a paraxial region thereof and an image-side surface being convex in a paraxial region thereof. The third lens element has positive refractive power. The fourth lens element has positive refractive power. The fifth lens element has negative refractive power. The optical photographing lens system has a total of five lens elements.

32 Claims, 22 Drawing Sheets

(56) References Cited

U.S. PATENT DOCUMENTS

| | | |
|---|---|---|
| 2012/0321293 A1 | 12/2012 | Schauss et al. |
| 2013/0279020 A1* | 10/2013 | Noda .................. G02B 3/04 |
| | | 359/708 |
| 2016/0147043 A1 | 5/2016 | Liao et al. |

FOREIGN PATENT DOCUMENTS

| | | |
|---|---|---|
| JP | 07253540 | 10/1995 |
| JP | 09113806 | 5/1997 |
| JP | 2004069718 | 3/2004 |
| JP | 2007047334 | 2/2007 |
| JP | 20100256608 | 11/2010 |
| JP | 2013025202 | 2/2013 |
| JP | 2013190574 | 9/2013 |
| JP | 2014109763 | 6/2014 |
| JP | 2015132687 | 7/2015 |

\* cited by examiner

OPTICAL PHOTOGRAPHING LENS SYSTEM, IMAGE CAPTURING UNIT AND ELECTRONIC DEVICE

RELATED APPLICATIONS

This application claims priority to Taiwan Application 105138725, filed Nov. 24, 2016, which is incorporated by reference herein in its entirety.

BACKGROUND

Technical Field

The present disclosure relates to an optical photographing lens system, an image capturing unit and an electronic device, more particularly to an optical photographing lens system and an image capturing unit applicable to an electronic device.

Description of Related Art

The specifications of the camera module have been strictly demanded in order to be applied to different kinds of electronic devices for various requirements. For the optical systems in conventional camera modules, due to the limitations to the shape of the lens surface and the material selection, it is difficult to reduce the size of the devices as well as achieve an appropriate balance among the lens molding, assembling convenience and sensitivity. Furthermore, the capability of normal operation with high image quality under different environmental conditions is also an important factor to design the optical systems. For various applications, the optical systems are developed with various optical characteristics, and have been widely applied to different kinds of smart electronic devices, such as vehicle cameras, advanced driver assistance systems (ADAS), lane departure warning systems, blind spot detectors, vehicle backup cameras, multiple lens devices, dashboard cameras, intelligent electronic devices, wearable devices, digital cameras, network surveillance devices and human-computer interaction systems, for various requirements.

Take the vehicle camera as an example, the optical system can be installed on front side, lateral side or other positions of the car in order to detect and sense the changes of the environment. The angle of view of the optical system can be designed according to the location/position information and the required sensing range, and the optical system is cooperated with software to determine the changes of the environment, thereby achieving self-driving or driver assistance. Also, the optical system can be cooperated with telecommunication device, radar, automatic high beam, blind spot detector, pedestrian detector, intelligent brake, road signs recognition, GPS and the like, for improving traffic safety and making life more convenient. In addition, in order to operate the optical system under different conditions, such as temperature variation and being impacted by an external force, the optical system should include a configuration featuring high heat resistance, high corrosion resistance and high mechanical strength.

Accordingly, there is a need to develop an optical system simultaneously featuring sufficiently large field of view, compact size, high image quality and high resistance to the environmental changes

SUMMARY

According to one aspect of the present disclosure, an optical photographing lens system, includes, in order from an object side to an image side, a first lens element, a second lens element, a third lens element, a fourth lens element and a fifth lens element. The second lens element has an object-side surface being concave in a paraxial region thereof and an image-side surface being convex in a paraxial region thereof. The third lens element has positive refractive power. The fourth lens element has positive refractive power. The fifth lens element has negative refractive power; wherein either an object-side surface of the fifth lens element, an image-side surface of the fifth lens element or both have at least one inflection point. The optical photographing lens system has a total of five lens elements. When a focal length of the optical photographing lens system is f, a refractive power of the first lens element is P1, a refractive power of the second lens element is P2, an axial distance between an object-side surface of the first lens element and the image-side surface of the fifth lens element is TD, an axial distance between the third lens element and the fourth lens element is T34, a curvature radius of the object-side surface of the second lens element is R3, a curvature radius of the image-side surface of the second lens element is R4, and a central thickness of the third lens element is CT3, the following conditions are satisfied:

$f/R3+f/R4<-1.30;$ $|P1|+|P2|<1.80;$ $2.0<TD/CT3<11.5;$ and $0<f/T34<5.0.$

According to another aspect of the present disclosure, an optical photographing lens system, includes, in order from an object side to an image side, a first lens element, a second lens element, a third lens element, a fourth lens element and a fifth lens element. The second lens element has an object-side surface being concave in a paraxial region thereof and an image-side surface being convex in a paraxial region thereof. The third lens element has positive refractive power. The fourth lens element has positive refractive power. The fifth lens element has negative refractive power; wherein either an object-side surface of the fifth lens element, an image-side surface of the fifth lens element or both have at least one inflection point. The optical photographing lens system has a total of five lens elements. The optical photographing lens system further includes an aperture stop. When a focal length of the optical photographing lens system is f, a refractive power of the first lens element is P1, a refractive power of the second lens element is P2, an axial distance between the aperture stop and the image-side surface of the fifth lens element is SD, an axial distance between an object-side surface of the first lens element and the image-side surface of the fifth lens element is TD, an axial distance between the third lens element and the fourth lens element is T34, a curvature radius of the object-side surface of the second lens element is R3, and a curvature radius of the image-side surface of the second lens element is R4, the following conditions are satisfied:

$f/R3+f/R4<-1.0;$ $|P1|+|P2|<1.80;$ $SD/TD<0.60;$ and $2.0<TD/T34<10.0.$

According to one aspect of the present disclosure, an image capturing unit includes the aforementioned optical photographing lens system and an image sensor, wherein the image sensor is disposed on an image surface of the optical photographing lens system.

According to one aspect of the present disclosure, an electronic device includes the aforementioned image capturing unit.

According to another aspect of the present disclosure, an optical photographing lens system includes, in order from an object side to an image side, a first lens element, a second lens element, a third lens element, a fourth lens element and a fifth lens element. The second lens element has an object-side surface being concave in a paraxial region thereof and an image-side surface being convex in a paraxial region thereof. The third lens element has positive refractive power. The fourth lens element has positive refractive power. The fifth lens element has negative refractive power. The optical photographing lens system has a total of five lens elements. When a focal length of the optical photographing lens system is f, a refractive power of the first lens element is P1, a refractive power of the second lens element is P2, an axial distance between the third lens element and the fourth lens element is T34, an axial distance between the image-side surface of the fifth lens element and an image surface is BL, a curvature radius of the object-side surface of the second lens element is R3, and a curvature radius of the image-side surface of the second lens element is R4, the following conditions are satisfied:

$$f/R3+f/R4 \leq -1.55;$$

$$|P1|+|P2|<1.80; \text{ and}$$

$$1.0 \text{ [mm]}<(T34*BL)/(T34+BL)<3.0 \text{ [mm]}.$$

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
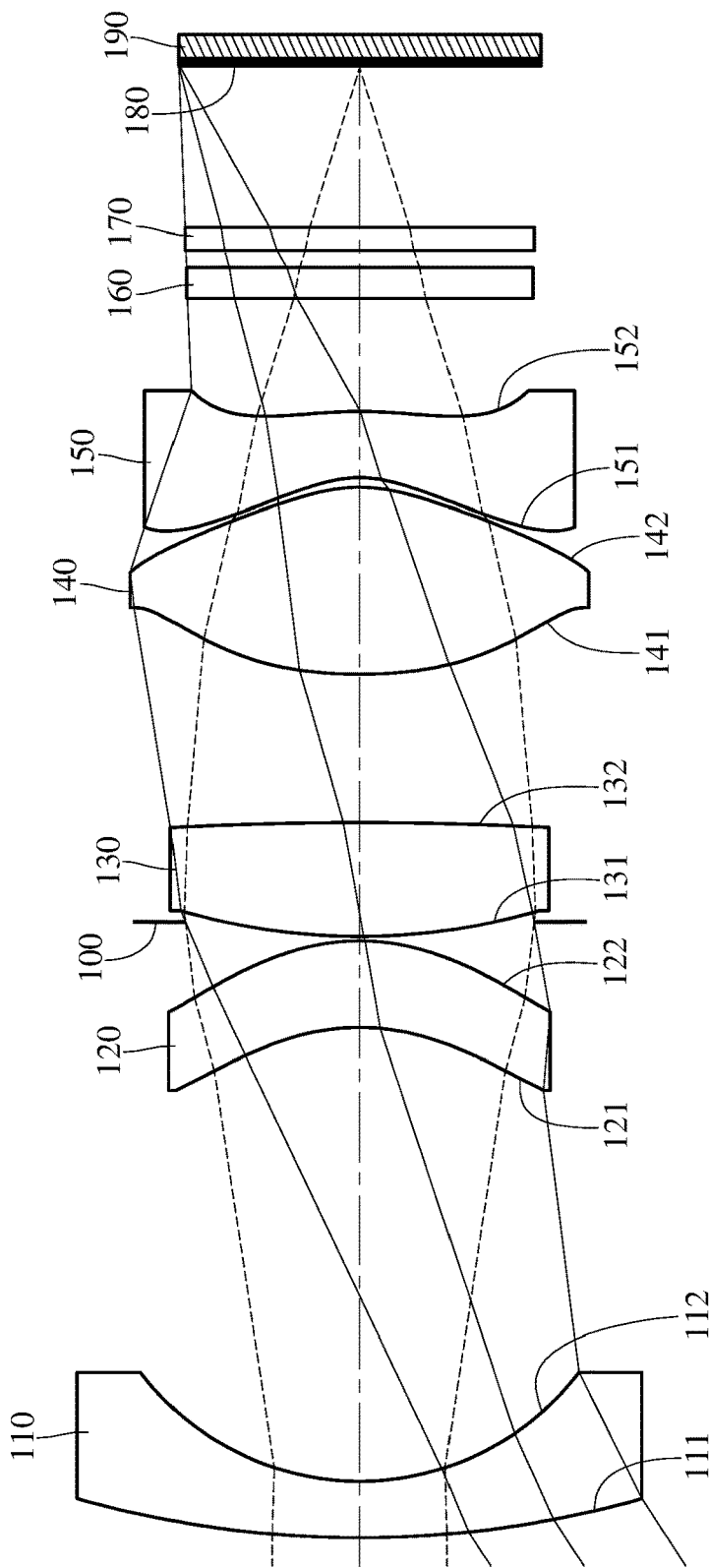
FIG. 1 is a schematic view of an image capturing unit according to the 1st embodiment of the present disclosure.

An optical photographing lens system includes, in order from an object side to an image side, a first lens element, a second lens element, a third lens element, a fourth lens element and a fifth lens element. The optical photographing lens system has a total of five lens elements.

There can be an air gap in a paraxial region between each adjacent lens element of the optical photographing lens system; that is, each of the first through the fifth lens elements can be a single and non-cemented lens element. The manufacturing process of the cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to displacement and it is thereby not favorable for the image quality. Therefore, having an air gap in a paraxial region between each of the adjacent lens elements of the optical photographing lens system in the present disclosure is favorable for preventing the problem generated by the cemented lens elements while improving the yield rate.

The second lens element can have negative refractive power. The second lens element has an object-side surface being concave in a paraxial region thereof and an image-side surface being convex in a paraxial region thereof. Therefore, it is favorable for correcting aberrations, thereby improving image quality.

The third lens element has positive refractive power. Therefore, it is favorable for the incident light traveling into the optical photographing lens system and reducing the sensitivity to the temperature variation under different environments.

The fourth lens element has positive refractive power; therefore, it is favorable for providing sufficient light convergence capability so as to reduce a total track length of the optical photographing lens system, thereby maintaining a compact size of the optical photographing lens system. In addition, the fourth lens element can have an object-side surface being convex in a paraxial region thereof; therefore, it is favorable for adjusting the shape of the object-side surface of the fourth lens element so as to strengthen the positive refractive power of the fourth lens element.

The fifth lens element has negative refractive power; therefore, it is favorable for balancing the positive refractive power of the fourth lens element and correcting chromatic aberrations to improve image quality. In addition, either an object-side surface of the fifth lens element, an image-side surface of the fifth lens element or both of the two surfaces can have at least one inflection point; therefore, it is favorable for adjusting the shape of the fifth lens element and controlling the incident angle of light projecting onto the image sensor so as to maintain sufficient illumination; also, it is favorable for correcting aberrations at the off-axial region.

When a focal length of the optical photographing lens system is f, a curvature radius of the object-side surface of the second lens element is R3, and a curvature radius of the image-side surface of the second lens element is R4, the following condition is satisfied: $f/R3+f/R4<-1.0$. Therefore, it is favorable for adjusting the curvatures of the surfaces of the second lens element, and favorable for the incident light traveling into the optical photographing lens system and correcting astigmatism to improve image quality. Preferably, the following condition can also be satisfied: $f/R3+f/R4<-1.30$. More preferably, the following condition can also be satisfied: $f/R3+f/R4\le-1.55$. Further preferably, the following condition can also be satisfied: $-7.50<f/R3+f/R4\le-1.75$.

When a refractive power of the first lens element is P1, and a refractive power of the second lens element is P2, the following condition is satisfied: $|P1|+|P2|<1.80$. Therefore, it is favorable for arranging the refractive power distribution at the object side of the optical photographing lens system, strengthening the capacity of correcting aberrations of the lens elements at the object side, and reducing sensitivity. Preferably, the following condition can also be satisfied: $|P1|+|P2|<1.40$. More preferably, the following condition can also be satisfied: $|P1|+|P2|<1.20$. In detail, P1 is a ratio of the focal length of the optical photographing lens system to the focal length of the first lens element, and P2 is a ratio of the focal length of the optical photographing lens system to the focal length of the second lens element.

When an axial distance between an object-side surface of the first lens element and the image-side surface of the fifth lens element is TD, and an central thickness of the third lens element is CT3, the following condition can be satisfied: $2.0<TD/CT3<11.5$. Therefore, it is favorable for arranging a proper amount of space occupied by the third lens element so as to increase manufacturing yield rate; also, it is favorable for reducing the influence of temperature variation on the optical photographing lens system, so that the optical photographing lens system is applicable to more kinds of applications.

When the focal length of the optical photographing lens system is f, and an axial distance between the third lens element and the fourth lens element is T34, the following condition can be satisfied: $0<f/T34<5.0$. Therefore, the axial distance between the third lens element and the fourth lens element is favorable for disposing other opto-mechanical components; also, it is favorable for assembling the optical photographing lens system. Preferably, the following condition can also be satisfied: $0<f/T34<3.50$. More preferably, the following condition can also be satisfied: $0<f/T34<2.50$.

According to the present disclosure, the optical photographing lens system further includes an aperture stop.

When an axial distance between the aperture stop and the image-side surface of the fifth lens element is SD, and an axial distance between the object-side surface of the first lens element and the image-side surface of the fifth lens element is TD, the following condition can be satisfied: $SD/TD<0.60$. Therefore, it is favorable for properly arranging the position of the aperture stop so as to improve the symmetry of the optical photographing lens system, thereby providing a sufficient field of view and featuring high image quality.

When the axial distance between the object-side surface of the first lens element and the image-side surface of the fifth lens element is TD, and the axial distance between the third lens element and the fourth lens element is T34, the following condition can be satisfied: $2.0<TD/T34<10.0$. Therefore, it is favorable for adjusting a proportion of the space between the third lens element and the fourth lens element to the total length of the optical photographing lens system, thereby increasing assembling yield rate. Preferably, the following condition can also be satisfied: $3.50<TD/T34<9.0$.

When the axial distance between the third lens element and the fourth lens element is T34, and an axial distance between the image-side surface of the fifth lens element and the image surface is BL, the following condition can be satisfied: $0.60 \text{ [millimeters]} <(T34*BL)/(T34+BL)<3.50 \text{ [millimeters]}$. Therefore, it is favorable for obtaining a balance of the back focal length and the axial distance between the third lens element and the fourth lens element so as to increase assembling yield rate; furthermore, it is favorable for providing sufficient back focal length for accommodating other opto-mechanical components so as to improve design flexibility. Preferably, the following condition can also be satisfied: $1.0 \text{ [millimeters]} <(T34*BL)/(T34+BL)<3.0 \text{ [millimeters]}$. More preferably, the following condition can also be satisfied: $1.70 \text{ [millimeters]} <(T34*BL)/(T34+BL)<2.80 \text{ [millimeters]}$.

When the focal length of the optical photographing lens system is f, and a focal length of the first lens element is f1, the following condition can be satisfied: $-0.67<f/f1<0.50$. Therefore, it is favorable for adjusting the distribution of the refractive power of the first lens element for light entering into the optical photographing lens system and reducing sensitivity, simultaneously.

When a maximum value among all maximum effective radii of all surfaces of the lens elements of the optical photographing lens system is SDmax, and a minimum value among all maximum effective radii of all surfaces of the lens elements of the optical photographing lens system is SDmin, the following condition can be satisfied: $1.0<SDmax/SDmin<2.50$. Therefore, the effective radii of the lens surfaces can be properly adjusted for obtaining a lens configuration having moderate light trajectory and eliminating stray light to improve the the image-sensing efficiency of the image sensor.

When the focal length of the optical photographing lens system is f, and an entrance pupil diameter of the optical photographing lens system is EPD, the following condition can be satisfied: $0.85<f/EPD<3.0$. Therefore, it is favorable for providing sufficient amount of light to improve illumination on the image surface; furthermore, it is favorable for capturing image of object with high image quality in a low light condition. Preferably, the following condition can also be satisfied: $0.85<f/EPD<2.50$. More preferably, the following condition can also be satisfied: $0.85<f/EPD<2.0$.

When an Abbe number of the second lens element is V2, and an Abbe number of the fifth lens element is V5, the following condition can be satisfied: $0<(V2+V5)/2<32.0$. Therefore, it is favorable for correcting chromatic aberrations so as to improve the image quality. Preferably, the following condition can also be satisfied: $0<(V2+V5)/2<25.0$.

According to the present disclosure, among the first through the fifth lens elements, at least three of the lens elements can be made of plastic material. Therefore, it is favorable for the material selection so as to be more flexible to design. Furthermore, the total track length of the optical photographing lens system can be shortened and the cost of the optical photographing lens system can be reduced.

When half of a maximum field of view of the optical photographing lens system is HFOV, the following condition can be satisfied: $\tan(HFOV)<1.50$. Therefore, it is favorable for providing a proper field of view for the optical photographing lens system to be widely applied to different applications.

According to the present disclosure, the optical photographing lens system further includes an aperture stop which can be disposed between the second lens element and the image surface. Therefore, it is favorable for positioning the aperture stop to obtain a sufficient field of view for more applications.

According to the present disclosure, a composite focal length of the lens elements of the optical photographing lens system disposed between the imaged object and the aperture stop can be positive value. For example, in some embodiments, the first through the fifth lens elements are divided into a front lens group and a rear lens group, wherein the lens elements in the front lens group are disposed between the imaged object and the aperture stop, the lens elements in the rear lens group are disposed between the aperture stop and the image surface, and a composite focal length of the front lens group is positive value. Therefore, it is favorable for arranging the refractive power of the lens elements near the object side so as to control the light path in the optical photographing lens system and to reduce the total track length.

Figure 19:
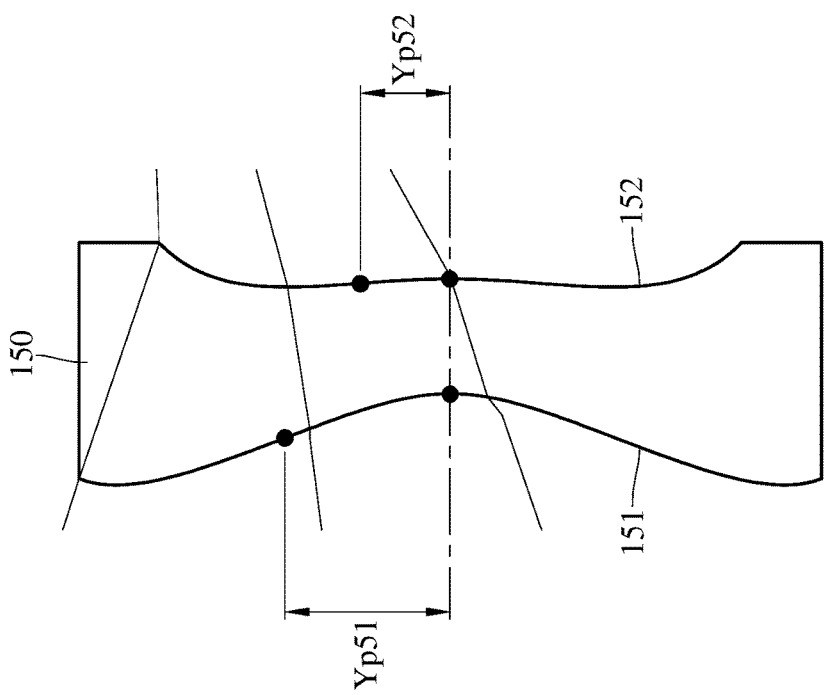
FIG. 19 is a schematic view of Yp51, Yp52 according to the 1st embodiment of the present disclosure.

When the focal length of the optical photographing lens system is f, a vertical distance between the at least one inflection point on the object-side surface of the fifth lens element closest to an optical axis and the optical axis is Yp51, a vertical distance between the at least one inflection point on the image-side surface of the fifth lens element closest to the optical axis and the optical axis is Yp52, the following conditions can be satisfied: $0.1<Yp51/f<2.0$; and $0.1<Yp52/f<2.0$. Therefore, the curvatures of the surfaces of the fifth lens element are favorable for correcting aberrations at an off-axial region so as to further improve the image quality. Please refer to FIG. 19; FIG. 19 is a schematic view of Yp51, Yp52 according to the 1st embodiment of the present disclosure. The value of Yp51 and the value of Yp52 are both determined as follows: when each of the object-side surface and the image-side surface of the fifth lens element has one single inflection point from the paraxial region to the off-axial region, the vertical distances between the optical axis and the inflection points are Yp51 and Yp52, respectively; when each of the object-side surface and the image-side surface of the fifth lens element has multiple inflection points from the paraxial region to the off-axial region, the vertical distances between the optical axis and one of the inflection points closest to the optical axis are Yp51 and Yp52, respectively.

When the axial distance between the third lens element and the fourth lens element is T34, an axial distance between the fourth lens element and the fifth lens element is T45, the following condition can be satisfied: $0.02<T45/T34<0.25$. Therefore, it is favorable for arranging the positions of the lens elements so as to obtain an easier lens assembling and reduce the sensitivity.

When an axial distance between the first lens element and the second lens element is T12, the axial distance between the third lens element and the fourth lens element is T34, the following condition can be satisfied: $0.55<T12/T34<3.45$. Therefore, it is favorable for balancing the axial distances between each adjacent lens element so as to increase assembling yield rate. Preferably, the following condition can also be satisfied: $0.60<T12/T34<2.85$.

When a curvature radius of the object-side surface of the fourth lens element is R7, a curvature radius of the image-side surface of the fourth lens element is R8, the following condition can be satisfied: $-1.0<(R7+R8)/(R7-R8)<2.0$. Therefore, the curvatures of the surfaces of the fourth lens element are favorable for improving the symmetry of the optical photographing lens system, thereby favorable for light convergence.

When the axial distance between the image-side surface of the fifth lens element and the image surface is BL, a sum of axial distances between each adjacent lens element of the optical photographing lens system is $\Sigma AT$, the following condition can be satisfied: $0<BL/\Sigma AT<1.50$. Therefore, it is favorable for arranging a ratio of each axial distance to the back focal length so as to obtain a balance between compact size and image quality; also, it is favorable for increasing assembling yield rate.

When the Abbe number of the fifth lens element is V5, the following condition can be satisfied: $0<V5<25.0$. Therefore, it is favorable for correcting chromatic aberrations so as to prevent blur in the image.

When a curvature radius of an object-side surface of the third lens element is R5, a curvature radius of an image-side surface of the third lens element is R6, the following condition can be satisfied: $|(R5+R6)/(R5-R6)|<9.50$. Therefore, the curvatures of the surfaces of the third lens element are favorable for lens molding, thereby preventing molding problems due to overly curved surfaces, and also preventing stress in the lens element.

According to the present disclosure, the lens elements of the optical photographing lens system can be made of glass or plastic material. When the lens elements are made of glass material, the refractive power distribution of the optical photographing lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the optical photographing lens system can also be reduced.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the optical photographing lens system on a corresponding image sensor can be flat or curved, particularly a concave curved surface facing towards the object side of the optical photographing lens system.

According to the present disclosure, the optical photographing lens system can include at least one stop, such as an aperture stop, a glare stop or a field stop. Said glare stop or said field stop is allocated for eliminating the stray light and thereby improving the image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the viewing angle and thereby provides a wider field of view.

According to the present disclosure, an image capturing unit includes the aforementioned optical photographing lens system and image sensor, wherein the image sensor is disposed on the image side and can be located on or near the image surface of the aforementioned optical photographing lens system. In some embodiments, the image capturing unit can further include a barrel member, a holder member or a combination thereof.

Figure 20:
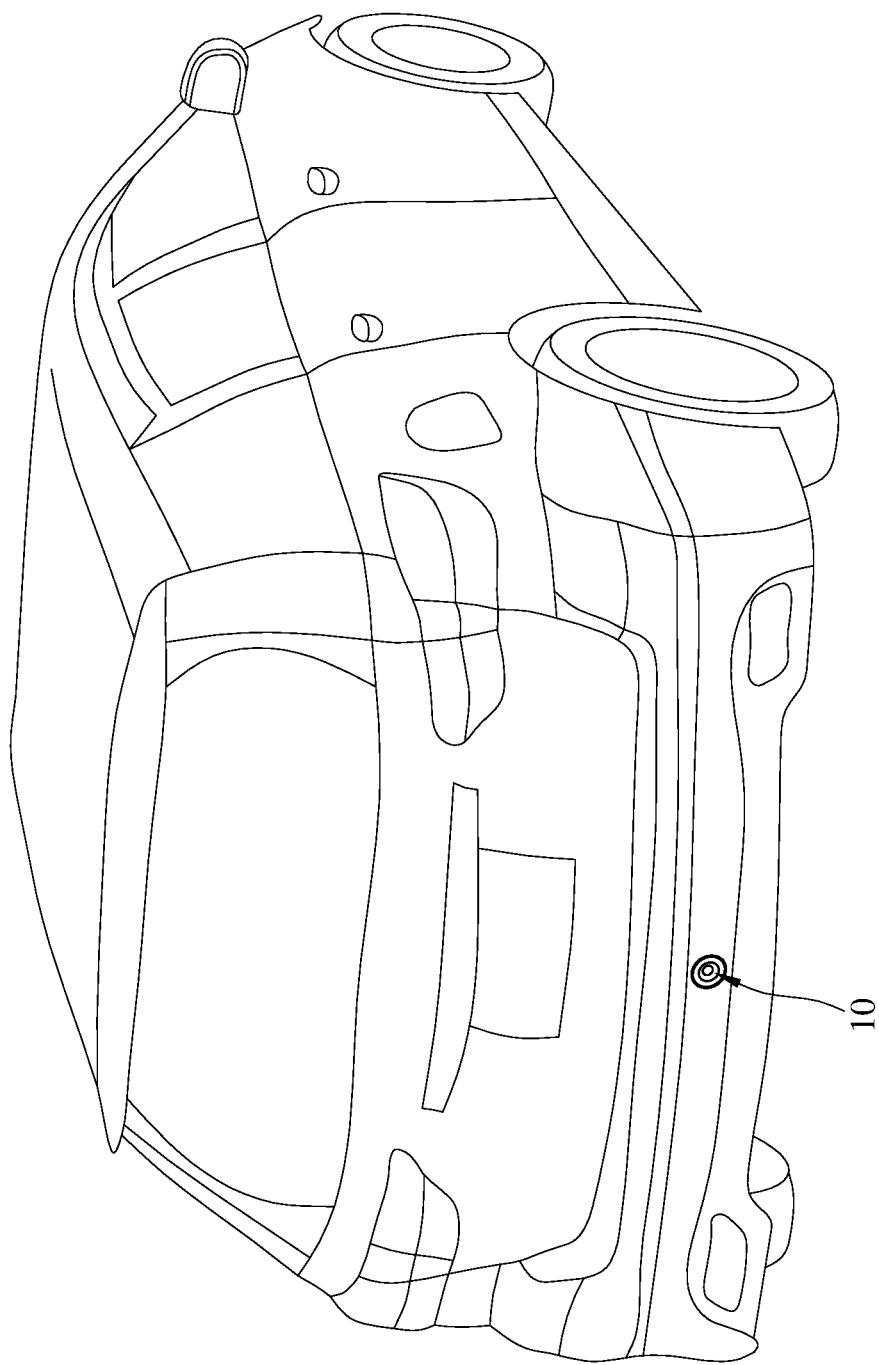
FIG. 20 shows an electronic device according to one embodiment.
Figure 21:
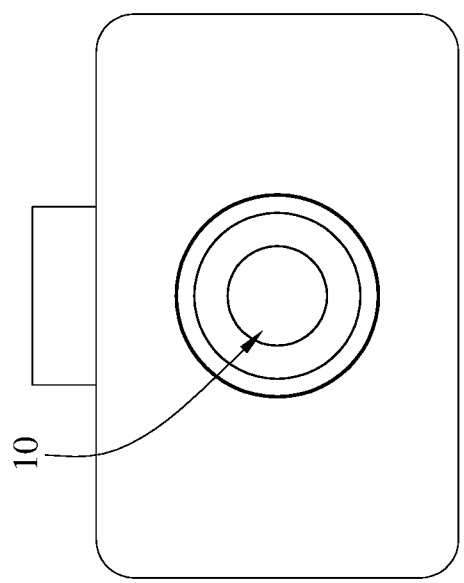
FIG. 21 shows an electronic device according to another embodiment.
Figure 22:
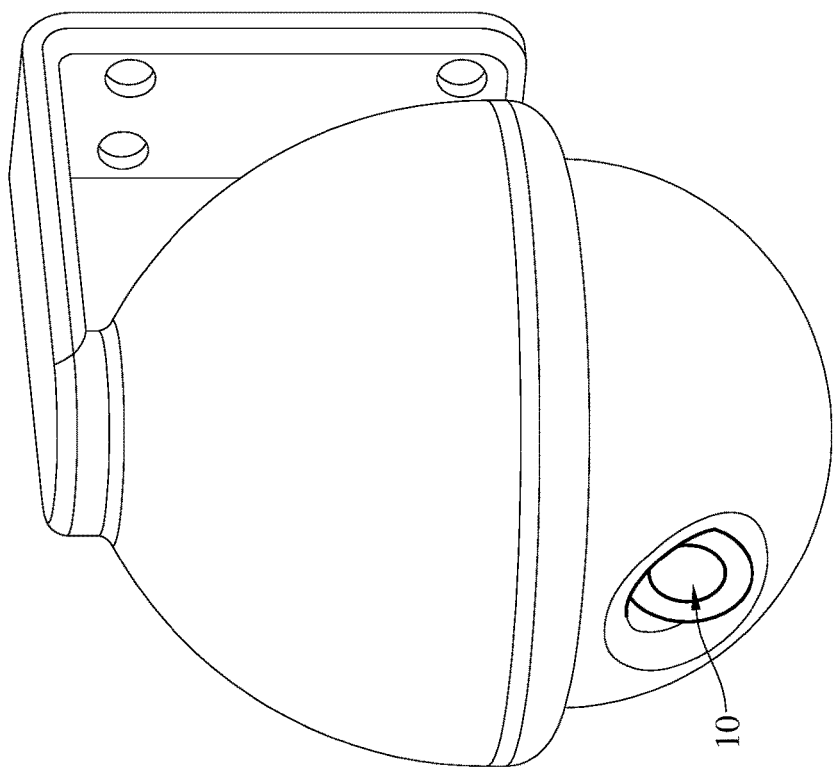
FIG. 22 shows an electronic device according to still another embodiment.

In FIG. 20, FIG. 21 and FIG. 22, an image capturing unit 10 may be installed in, but not limited to, an electronic device, including a vehicle backup camera (FIG. 20), a dashboard camera (FIG. 21) or a network surveillance device (FIG. 22). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the optical photographing lens system can be optionally applied to optical systems with a movable focus. Furthermore, the optical photographing lens system is featured with good capability in aberration corrections and high image quality, and can be applied to 3D (three-dimensional) image capturing applications, in products, such as digital cameras, mobile devices, digital tablets, wearable devices, smart televisions, network surveillance devices, multiple lens devices, motion sensing input devices, dashboard cameras, vehicle backup cameras and other electronic imaging devices. According to the above description of the present disclosure, the following specific embodiments are provided for further explanation.

1st Embodiment

Figure 2:
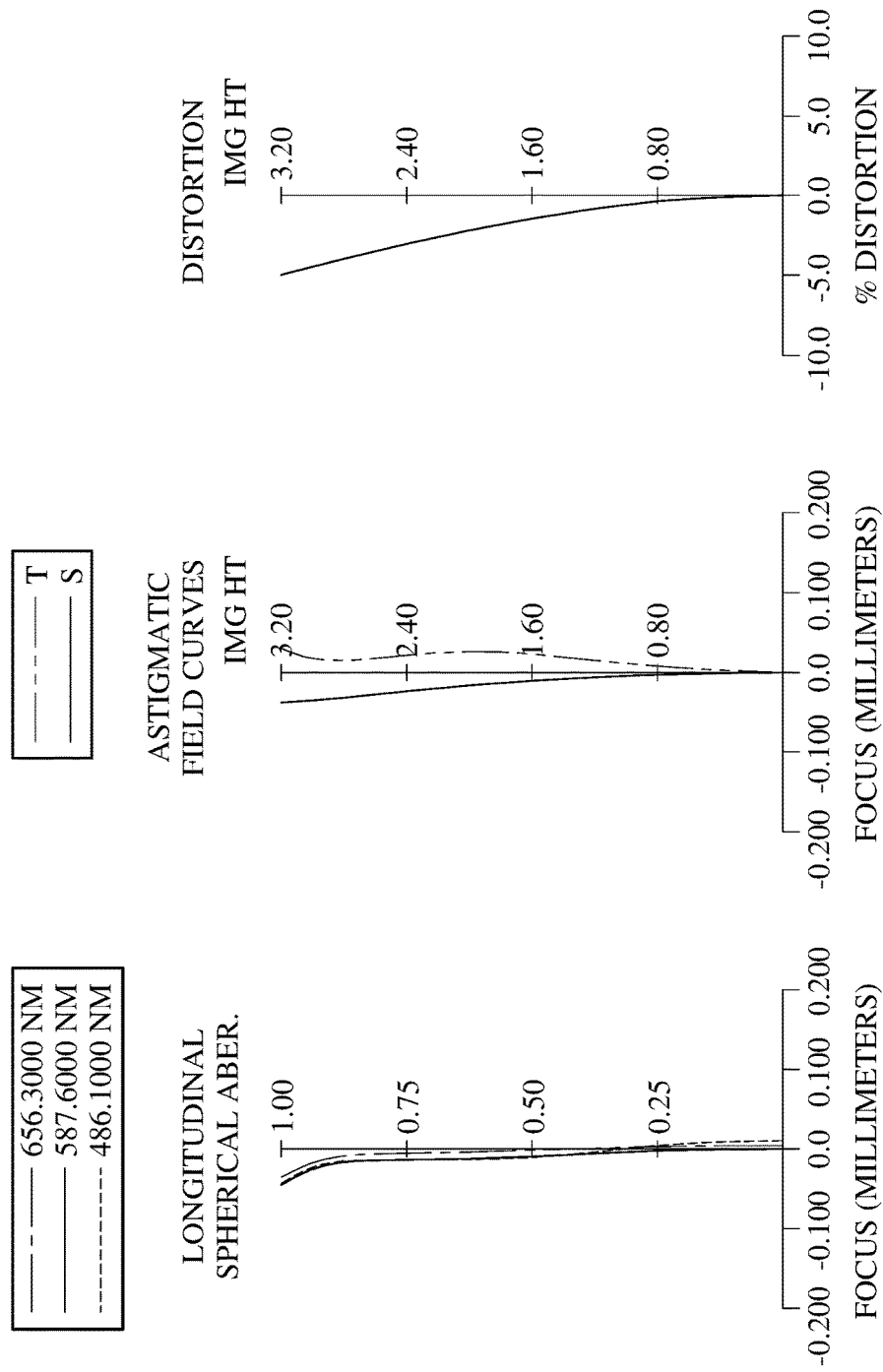
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical photographing lens system (its reference numeral is omitted) of the present disclosure and an image sensor 190. The optical photographing lens system includes, in order from an object side to an image side, a first lens element 110, a second lens element 120, an aperture stop 100, a third lens element 130, a fourth lens element 140, a fifth lens element 150, an IR-cut filter 160, a cover glass 170 and an image surface 180, wherein the optical photographing lens system has a total of five single and non-cemented lens elements (110-150).

The first lens element 110 with negative refractive power has an object-side surface 111 being convex in a paraxial region thereof and an image-side surface 112 being concave in a paraxial region thereof. The first lens element 110 is made of glass material and has the object-side surface 111 and the image-side surface 112 being both spherical.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of glass material and has the object-side surface 131 and the image-side surface 132 being both spherical.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. Both the object-side surface 151 and the image-side surface 152 have at least one inflection point.

The filter 160 and the cover glass 170 are both made of glass material and located between the fifth lens element 150 and the image surface 180, and will not affect the focal length of the optical photographing lens system. The image sensor 190 is disposed on or near the image surface 180 of the optical photographing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, and 14.

In the optical photographing lens system of the image capturing unit according to the 1st embodiment, when a focal length of the optical photographing lens system is f, an f-number of the optical photographing lens system is Fno, and half of a maximum field of view of the optical photographing lens system is HFOV, these parameters have the following values: f=5.19 millimeters (mm), Fno=1.68, HFOV=33.0 degrees (deg.).

When half of the maximum field of view of the optical photographing lens system is HFOV, the following condition is satisfied: tan(HFOV)=0.65.

When an Abbe number of the fifth lens element 150 is V5, the following condition is satisfied: V5=23.5.

When an Abbe number of the second lens element 120 is V2, and the Abbe number of the fifth lens element 150 is V5, the following condition is satisfied: (V2+V5)/2=39.71.

When an axial distance between the first lens element 110 and the second lens element 120 is T12, and an axial distance between the third lens element 130 and the fourth lens element 140 is T34, the following condition is satisfied: T12/T34=3.07.

When the axial distance between the third lens element 130 and the fourth lens element 140 is T34, and an axial distance between the fourth lens element 140 and the fifth lens element 150 is T45, the following condition is satisfied: T45/T34=0.06.

When an axial distance between the object-side surface 111 of the first lens element 110 and the image-side surface 152 of the fifth lens element 150 is TD, and an central thickness of the third lens element 130 is CT3, the following condition is satisfied: TD/CT3=9.87.

When the axial distance between the object-side surface 111 of the first lens element 110 and the image-side surface 152 of the fifth lens element 150 is TD, and the axial distance between the third lens element 130 and the fourth lens element 140 is T34, the following condition is satisfied: TD/T34=7.62.

When the axial distance between the third lens element 130 and the fourth lens element 140 is T34, and an axial distance between the image-side surface 152 of the fifth lens element 150 and the image surface 180 is BL, the following condition is satisfied: (T34*BL)/(T34+BL)=1.83 mm.

When the axial distance between the image-side surface 152 of the fifth lens element 150 and the image surface 180 is BL, and a sum of axial distances between each adjacent lens element of the optical photographing lens system is ΣAT, the following condition is satisfied: BL/ΣAT=0.56.

When a curvature radius of the object-side surface 131 of the third lens element 130 is R5, and a curvature radius of the image-side surface 132 of the third lens element 130 is R6, the following condition is satisfied: |(R5+R6)/(R5−R6)|=0.70.

When a curvature radius of the object-side surface 141 of the fourth lens element 140 is R7, and a curvature radius of the image-side surface 142 of the fourth lens element 140 is R8, the following condition is satisfied: (R7+R8)/(R7−R8)=0.52.

When an axial distance between the aperture stop 100 and the image-side surface 152 of the fifth lens element 150 is SD, and the axial distance between the object-side surface 111 of the first lens element 110 and the image-side surface 152 of the fifth lens element 150 is TD, the following condition is satisfied: SD/TD=0.45.

When a maximum value among all maximum effective radii of all surfaces of the lens elements of the optical photographing lens system is SDmax, and a minimum value among all maximum effective radii of all surfaces of the lens elements of the optical photographing lens system is SDmin, the following condition is satisfied: SDmax/SDmin=1.67.

When the focal length of the optical photographing lens system is f, a curvature radius of the object-side surface 121 of the second lens element 120 is R3, and a curvature radius of the image-side surface 122 of the second lens element 120 is R4, the following condition is satisfied: f/R3+f/R4=−2.69.

When the focal length of the optical photographing lens system is f, and the axial distance between the third lens element 130 and the fourth lens element 140 is T34, the following condition is satisfied: f/T34=1.99.

When the focal length of the optical photographing lens system is f, and a focal length of the first lens element 110 is f1, the following condition is satisfied: f/f1=−0.46.

When the focal length of the optical photographing lens system is f, and an entrance pupil diameter of the optical photographing lens system is EPD, the following condition is satisfied: f/EPD=1.68.

When the focal length of the optical photographing lens system is f, and a vertical distance between the at least one inflection point on the object-side surface 151 of the fifth lens element 150 closest to an optical axis and the optical axis is Yp51, the following condition is satisfied: Yp51/f=0.32.

When the focal length of the optical photographing lens system is f, and a vertical distance between the at least one inflection point on the image-side surface 152 of the fifth lens element 150 closest to the optical axis and the optical axis is Yp52, the following condition is satisfied: Yp52/f=0.18.

When a refractive power of the first lens element 110 is P1, and a refractive power of the second lens element 120 is P2, the following condition is satisfied: |P1|+|P2|=0.58.

The detailed optical data of the 1st embodiment are shown in Table 1 and the aspheric surface data are shown in Table 2 below.

TABLE 1

1st Embodiment
f = 5.19 mm, Fno = 1.68, HFOV = 33.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 18.278 | 1.000 | Glass | 1.603 | 60.7 | −11.25 |
| 2 | | 4.848 | 8.015 | | | | |
| 3 | Lens 2 | −3.912 (ASP) | 1.531 | Plastic | 1.534 | 55.9 | 43.52 |
| 4 | | −3.804 (ASP) | 0.333 | | | | |
| 5 | Ape. Stop | Plano | −0.253 | | | | |
| 6 | Lens 3 | 11.276 | 2.015 | Glass | 1.603 | 60.7 | 16.05 |
| 7 | | −63.882 | 2.612 | | | | |

TABLE 1-continued

1st Embodiment
f = 5.19 mm, Fno = 1.68, HFOV = 33.0 deg.

| Surface # | | Curvature Radius | | Thickness | Material | Index | Abbe # | Focal Length |
|---|---|---|---|---|---|---|---|---|
| 8 | Lens 4 | 8.109 | (ASP) | 3.306 | Plastic | 1.534 | 55.9 | 4.06 |
| 9 | | −2.537 | (ASP) | 0.166 | | | | |
| 10 | Lens 5 | −2.068 | (ASP) | 1.172 | Plastic | 1.639 | 23.5 | −4.83 |
| 11 | | −7.651 | (ASP) | 2.000 | | | | |
| 12 | Filter | Plano | | 0.550 | Glass | 1.517 | 64.2 | — |
| 13 | | Plano | | 0.300 | | | | |
| 14 | cover glass | Plano | | 0.400 | Glass | 1.517 | 64.2 | — |
| 15 | | Plano | | 2.856 | | | | |
| 16 | Image | Plano | | — | | | | |

Note:
Reference wavelength is 587.6 nm (d-line).

TABLE 2

Aspheric Coefficients

| | Surface # | | |
|---|---|---|---|
| | 3 | 4 | 8 |
| k = | −2.9378E−01 | −9.1087E−01 | 2.1890E+00 |
| A4 = | 2.5940E−03 | 1.3391E−03 | 3.0694E−03 |
| A6 = | 1.4973E−04 | 5.5625E−05 | −2.0427E−04 |
| A8 = | — | — | 1.1181E−05 |
| A10 = | — | — | −8.0367E−07 |

| | Surface # | | |
|---|---|---|---|
| | 9 | 10 | 11 |
| k = | −6.8122E+00 | −5.1870E+00 | −4.1064E+01 |
| A4 = | 6.4202E−04 | 1.9672E−03 | 6.5788E−03 |
| A6 = | −1.8832E−04 | −1.9953E−05 | −4.5596E−05 |
| A8 = | 1.4197E−05 | 1.6046E−06 | 3.2842E−05 |
| A10 = | −4.7856E−07 | 2.2399E−07 | — |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A10 represent the aspheric coefficients ranging from the 4th order to the 10th order. The tables presented below for each embodiment are related to the corresponding schematic and aberration curves figures in the drawing, and the definitions of the terms in the tables are the same as Table 1 and Table 2 of the 1st embodiment. Therefore, an explanation in this regard will not be provided again.

2nd Embodiment

Figure 3:
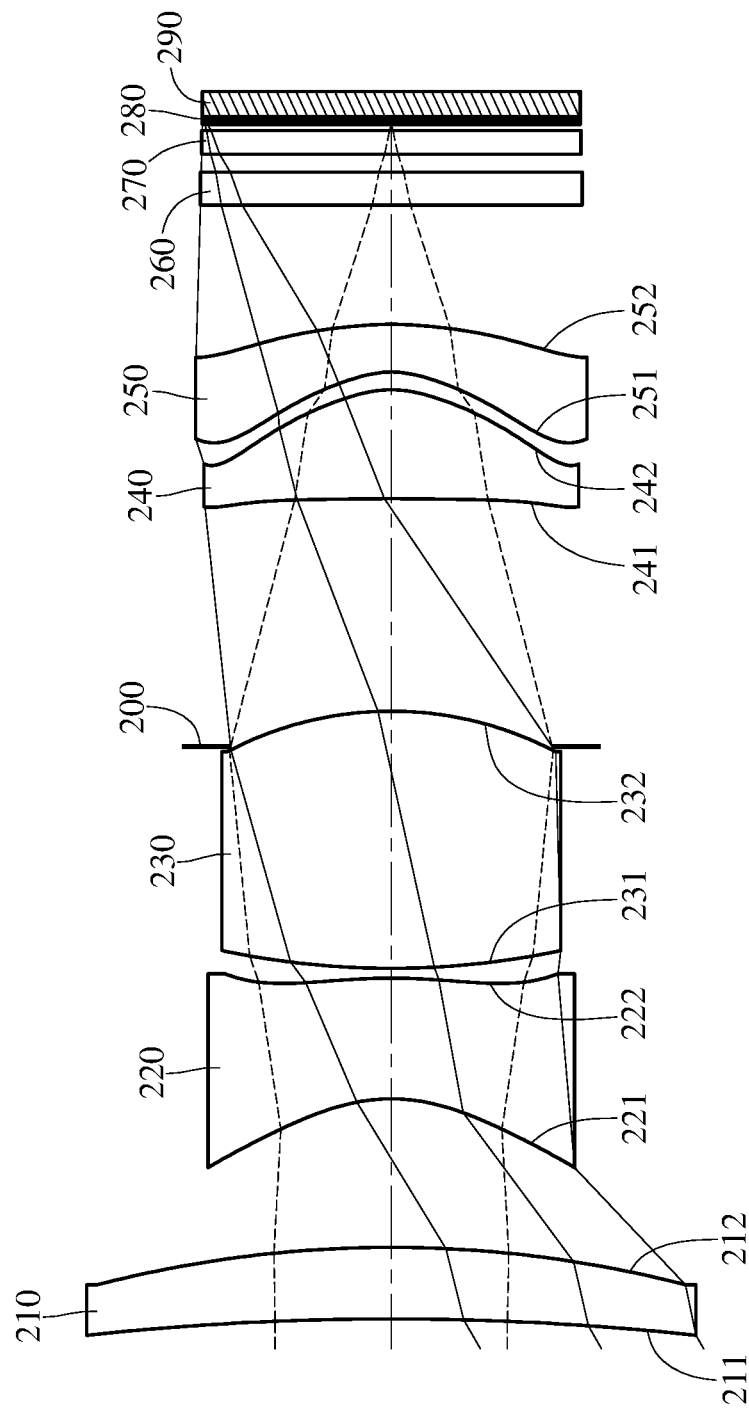
FIG. 3 is a schematic view of an image capturing unit according to the 2nd embodiment of the present disclosure.
Figure 4:
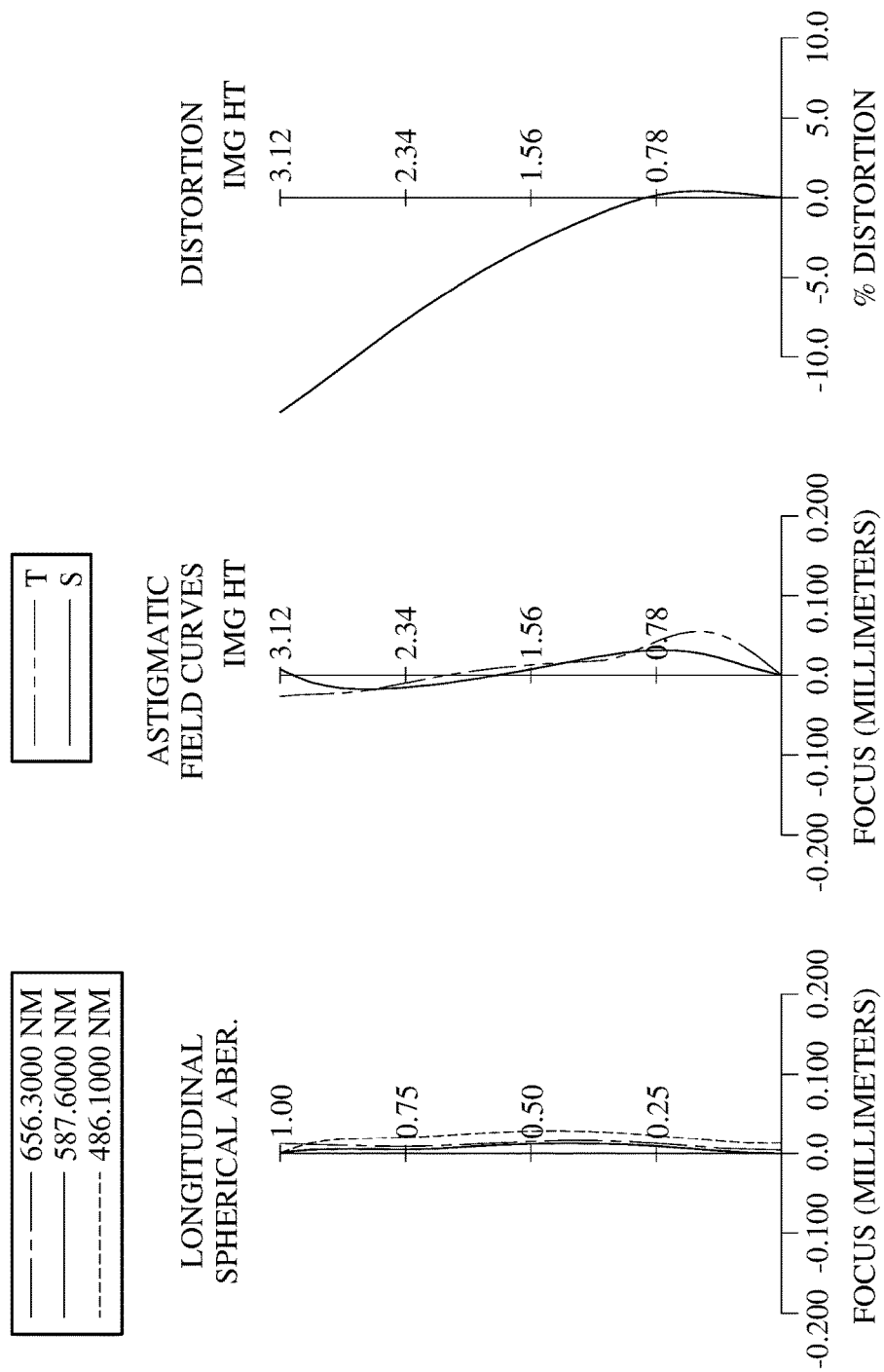
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical photographing lens system (its reference numeral is omitted) of the present disclosure and an image sensor 290. The optical photographing lens system includes, in order from an object side to an image side, a first lens element 210, a second lens element 220, a third lens element 230, an aperture stop 200, a fourth lens element 240, a fifth lens element 250, a filter 260, a cover glass 270 and an image surface 280, wherein the optical photographing lens system has a total of five single and non-cemented lens elements (210-250).

The first lens element 210 with positive refractive power has an object-side surface 211 being concave in a paraxial region thereof and an image-side surface 212 being convex in a paraxial region thereof. The first lens element 210 is made of glass material and has the object-side surface 211 and the image-side surface 212 being both spherical.

The second lens element 220 with negative refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of glass material and has the object-side surface 231 and the image-side surface 232 being both spherical.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material, and has the object-side surface 251 and the image-side surface 252 being both aspheric. Both the object-side surface 251 and the image-side surface 252 have at least one inflection point.

The filter 260 and the cover glass 270 are both made of glass material and located between the fifth lens element 250 and the image surface 280, and will not affect the focal length of the optical photographing lens system.

In this embodiment, a composite focal length of the first lens element 210, the second lens element 220 and the third lens element 230, which are disposed between an imaged object (not shown in the drawings) and the aperture stop 200, is positive value. Specifically, the composite focal length of the first lens element 210, the second lens element 220 and the third lens element 230 is 7.23 mm.

The detailed optical data of the 2nd embodiment are shown in Table 3 and the aspheric surface data are shown in Table 4 below.

TABLE 3

2nd Embodiment
f = 6.30 mm, Fno = 1.62, HFOV = 29.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −47.619 | 1.200 | Glass | 1.923 | 20.9 | 35.51 |
| 2 | | −19.647 | 2.491 | | | | |
| 3 | Lens 2 | −2.890 (ASP) | 2.023 | Plastic | 1.650 | 21.5 | −7.27 |
| 4 | | −9.478 (ASP) | 0.165 | | | | |
| 5 | Lens 3 | 13.652 | 4.311 | Glass | 1.804 | 46.5 | 5.69 |
| 6 | | −5.907 | −0.594 | | | | |
| 7 | Ape. Stop | Plano | 4.157 | | | | |
| 8 | Lens 4 | −45.959 (ASP) | 1.826 | Plastic | 1.544 | 55.9 | 3.33 |
| 9 | | −1.767 (ASP) | 0.299 | | | | |
| 10 | Lens 5 | −1.507 (ASP) | 0.800 | Plastic | 1.650 | 21.5 | −3.74 |
| 11 | | −4.784 (ASP) | 2.000 | | | | |
| 12 | Filter | Plano | 0.550 | Glass | 1.517 | 64.2 | — |
| 13 | | Plano | 0.300 | | | | |
| 14 | cover glass | Plano | 0.400 | Glass | 1.517 | 64.2 | — |
| 15 | | Plano | 0.104 | | | | |
| 16 | Image | Plano | — | | | | |

Note:
Reference wavelength is 587.6 nm (d-line).

TABLE 4

Aspheric Coefficients

| | Surface # | | |
|---|---|---|---|
| | 3 | 4 | 8 |
| k = | −1.8573E+00 | 5.5877E+00 | −9.9000E+01 |
| A4 = | 4.0580E−03 | 8.5773E−03 | 1.7438E−03 |
| A6 = | −1.8730E−04 | 1.1328E−04 | −2.3170E−04 |
| A8 = | — | — | −6.3537E−05 |
| A10 = | — | — | 6.6087E−06 |

| | Surface # | | |
|---|---|---|---|
| | 9 | 10 | 11 |
| k = | −6.1499E+00 | −6.9026E+00 | −8.2437E+01 |
| A4 = | −9.6193E−03 | −1.3135E−02 | −8.9365E−03 |
| A6 = | 7.6908E−04 | 3.2825E−04 | 7.4608E−04 |
| A8 = | −9.5250E−05 | 1.7353E−04 | −1.0667E−05 |
| A10 = | 1.0083E−05 | −8.4039E−06 | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.30 | \|(R5 + R6)/(R5 − R6)\| | 0.40 |
| Fno | 1.62 | (R7 + R8)/(R7 − R8) | 1.08 |

-continued

| 2nd Embodiment | | | |
|---|---|---|---|
| HFOV [deg.] | 29.8 | SD/TD | 0.42 |
| tan(HFOV) | 0.57 | SDmax/SDmin | 1.85 |
| V5 | 21.5 | f/R3 + f/R4 | −2.84 |
| (V2 + V5)/2 | 21.47 | f/T34 | 1.77 |
| T12/T34 | 0.70 | f/f1 | 0.18 |
| T45/T34 | 0.08 | f/EPD | 1.62 |
| TD/CT3 | 3.87 | Yp51/f | 0.33 |
| TD/T34 | 4.68 | Yp52/f | 0.38 |
| (T34 * BL)/(T34 + BL) [mm] | 1.73 | \|P1\| + \|P2\| | 1.04 |
| BL/ΣAT | 0.51 | — | — |

3rd Embodiment

Figure 5:
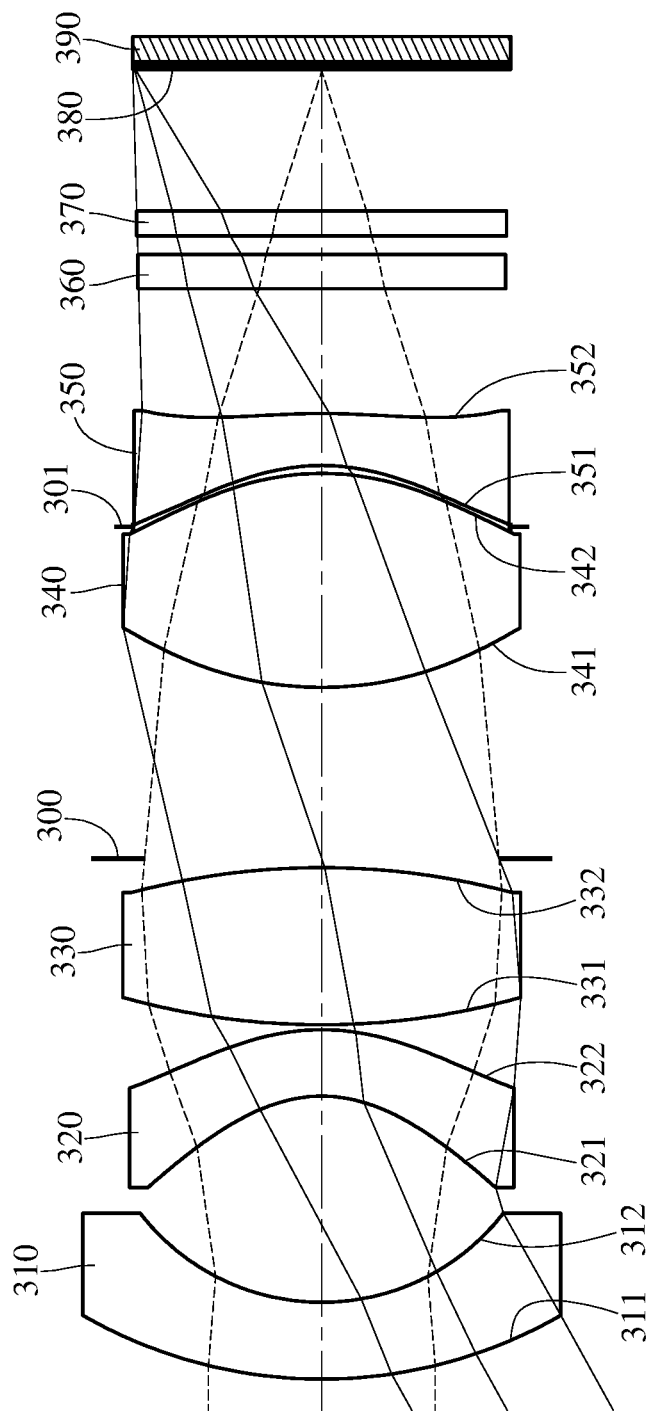
FIG. 5 is a schematic view of an image capturing unit according to the 3rd embodiment of the present disclosure.
Figure 6:
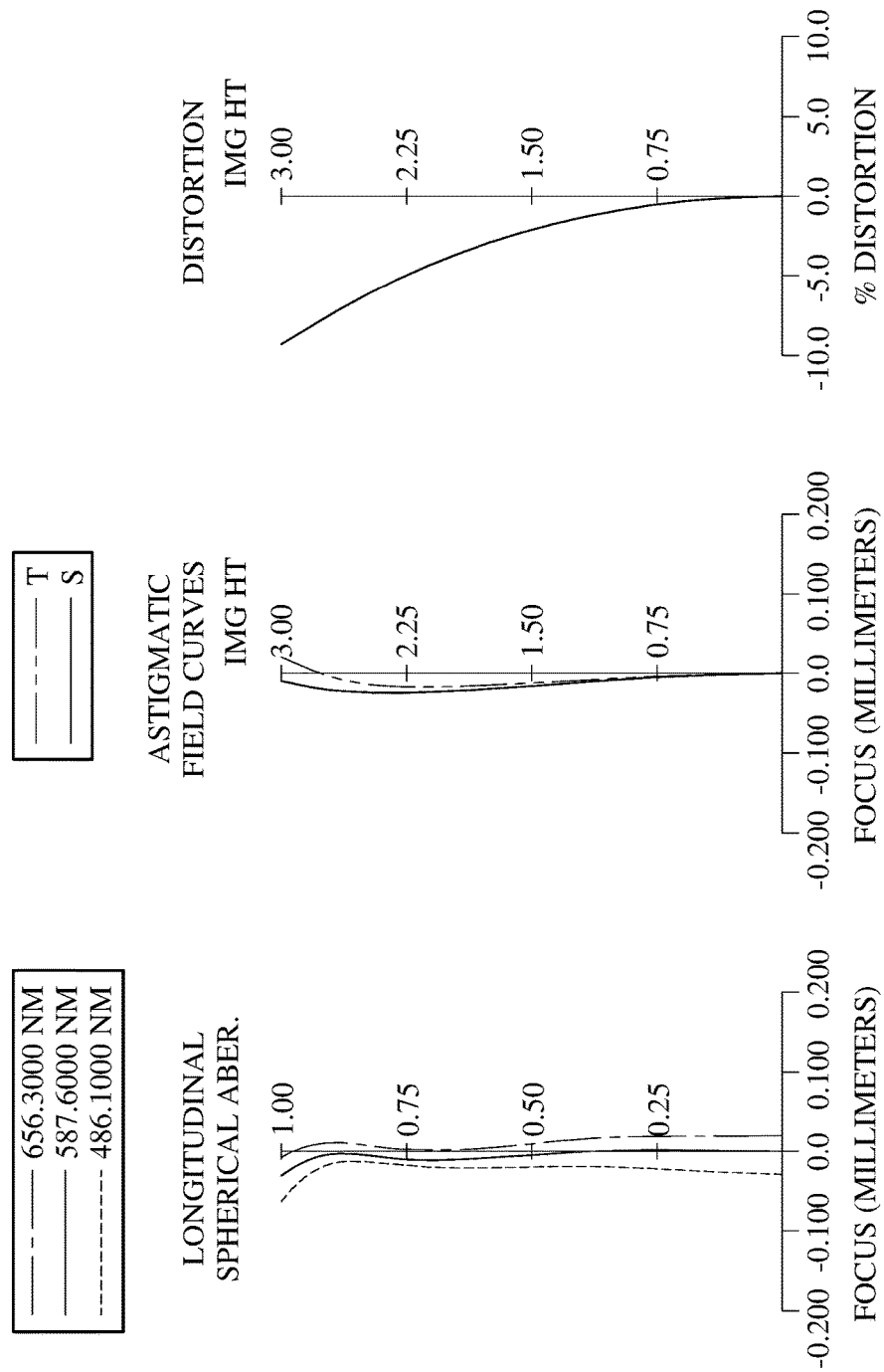
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical photographing lens system (its reference numeral is omitted) of the present disclosure and an image sensor 390. The optical photographing lens system includes, in order from an object side to an image side, a first lens element 310, a second lens element 320, a third lens element 330, an aperture stop 300, a fourth lens element 340, a stop 301, a fifth lens element 350, a filter 360, a cover glass 370 and an image surface 380, wherein the optical photographing lens system has a total of five single and non-cemented lens elements (310-350).

The first lens element 310 with negative refractive power has an object-side surface 311 being convex in a paraxial region thereof and an image-side surface 312 being concave in a paraxial region thereof. The first lens element 310 is made of glass material and has the object-side surface 311 and the image-side surface 312 being both spherical.

The second lens element 320 with negative refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of glass material and has the object-side surface 331 and the image-side surface 332 being both spherical.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. Both the object-side surface 351 and the image-side surface 352 have at least one inflection point.

The filter 360 and the cover glass 370 are both made of glass material and located between the fifth lens element 350 and the image surface 380, and will not affect the focal length of the optical photographing lens system.

In this embodiment, a composite focal length of the first lens element 310, the second lens element 320 and the third lens element 330, which are disposed between an imaged object (not shown in the drawings) and the aperture stop 300, is positive value. Specifically, the composite focal length of the first lens element 310, the second lens element 320 and the third lens element 330 is 21.33 mm.

The detailed optical data of the 3rd embodiment are shown in Table 5 and the aspheric surface data are shown in Table 6 below.

TABLE 5

3rd Embodiment
f = 5.99 mm, Fno = 1.65, HFOV = 28.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 7.675 | 1.232 | Glass | 1.497 | 81.6 | −15.78 |
| 2 | | 3.673 | 3.306 | | | | |
| 3 | Lens 2 | −2.221 (ASP) | 1.065 | Plastic | 1.639 | 23.5 | −13.03 |
| 4 | | −3.596 (ASP) | 0.080 | | | | |
| 5 | Lens 3 | 11.782 | 2.520 | Glass | 1.772 | 49.6 | 8.00 |
| 6 | | −11.782 | 0.145 | | | | |
| 7 | Ape. Stop | Plano | 2.746 | | | | |
| 8 | Lens 4 | 5.591 (ASP) | 3.431 | Plastic | 1.534 | 55.9 | 5.22 |
| 9 | | −4.369 (ASP) | −0.856 | | | | |
| 10 | stop | Plano | 0.983 | | | | |
| 11 | Lens 5 | −3.391 (ASP) | 0.834 | Plastic | 1.639 | 23.5 | −7.74 |
| 12 | | −11.847 (ASP) | 2.000 | | | | |
| 13 | Filter | Plano | 0.550 | Glass | 1.517 | 64.2 | — |
| 14 | | Plano | 0.300 | | | | |
| 15 | cover glass | Plano | 0.400 | Glass | 1.517 | 64.2 | — |
| 16 | | Plano | 2.268 | | | | |
| 17 | Image | Plano | — | | | | |

Note:
Reference wavelength is 587.6 nm (d-line).
An effective radius of the stop 301 (Surface 10) is 3.02 mm.

TABLE 6

Aspheric Coefficients

| Surface # | | | |
|---|---|---|---|
| | 3 | 4 | 8 |
| k = | −7.7965E−01 | −1.0293E+00 | 5.1957E−01 |
| A4 = | 7.7211E−03 | 4.1776E−03 | −2.6297E−04 |
| A6 = | — | — | −1.0189E−05 |
| A8 = | — | — | −5.8637E−06 |

| Surface # | | | |
|---|---|---|---|
| | 9 | 11 | 12 |
| k = | −6.3626E−01 | −3.6341E+00 | −5.6783E+00 |
| A4 = | −1.8987E−03 | −2.7865E−03 | 8.5502E−03 |
| A6 = | 7.1706E−04 | 3.9875E−04 | −8.1453E−04 |
| A8 = | −3.4402E−05 | 1.2995E−05 | 8.8724E−05 |
| A10 = | — | −2.2572E−06 | −4.2475E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.99 | \|(R5 + R6)/(R5 − R6)\| | 0.00 |
| Fno | 1.65 | (R7 + R8)/(R7 − R8) | 0.12 |
| HFOV [deg.] | 28.9 | SD/TD | 0.46 |
| tan(HFOV) | 0.55 | SDmax/SDmin | 1.37 |
| V5 | 23.5 | f/R3 + f/R4 | −4.36 |
| (V2 + V5)/2 | 23.49 | f/T34 | 2.07 |
| T12/T34 | 1.14 | f/f1 | −0.38 |
| T45/T34 | 0.04 | f/EPD | 1.65 |
| TD/CT3 | 6.15 | Yp51/f | 0.37 |
| TD/T34 | 5.36 | Yp52/f | 0.16 |
| (T34 * BL)/(T34 + BL) [mm] | 1.90 | \|P1\| + \|P2\| | 0.84 |
| BL/ΣAT | 0.86 | — | — |

4th Embodiment

Figure 7:
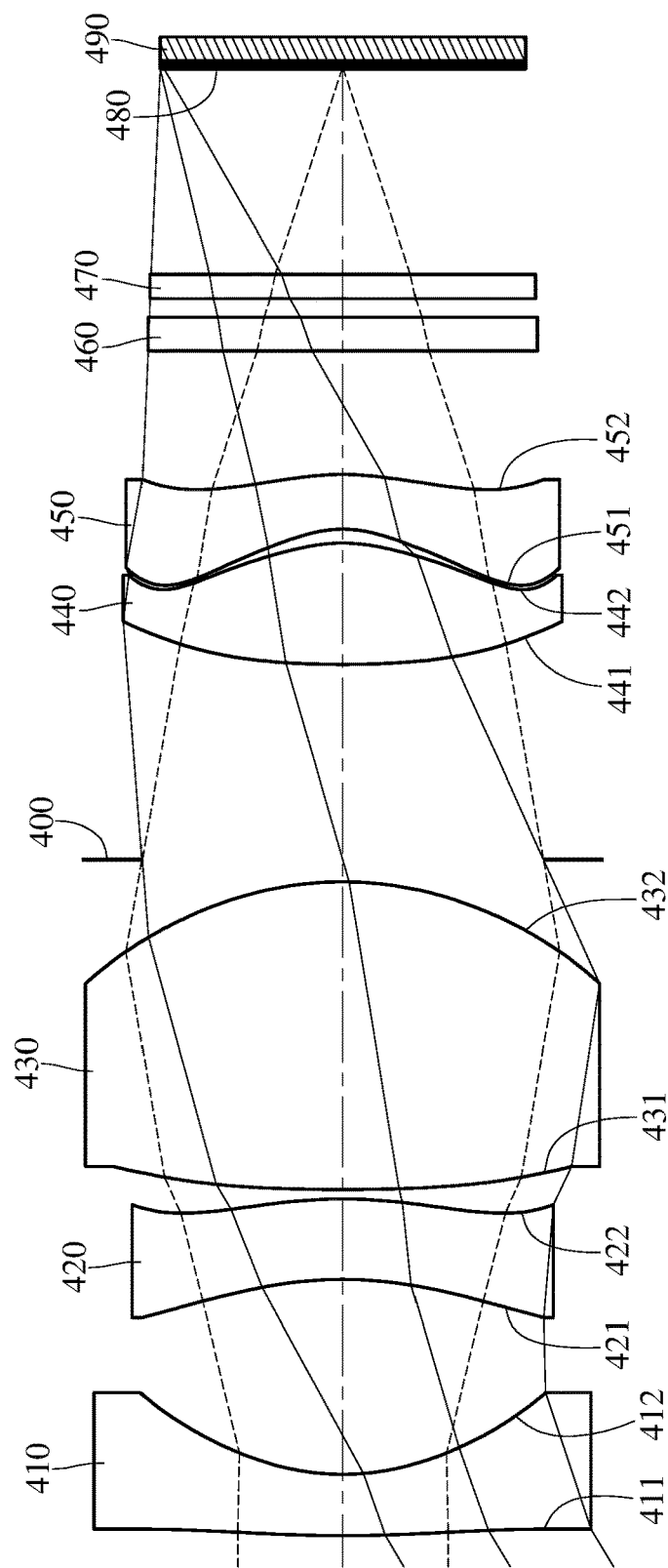
FIG. 7 is a schematic view of an image capturing unit according to the 4th embodiment of the present disclosure.
Figure 8:
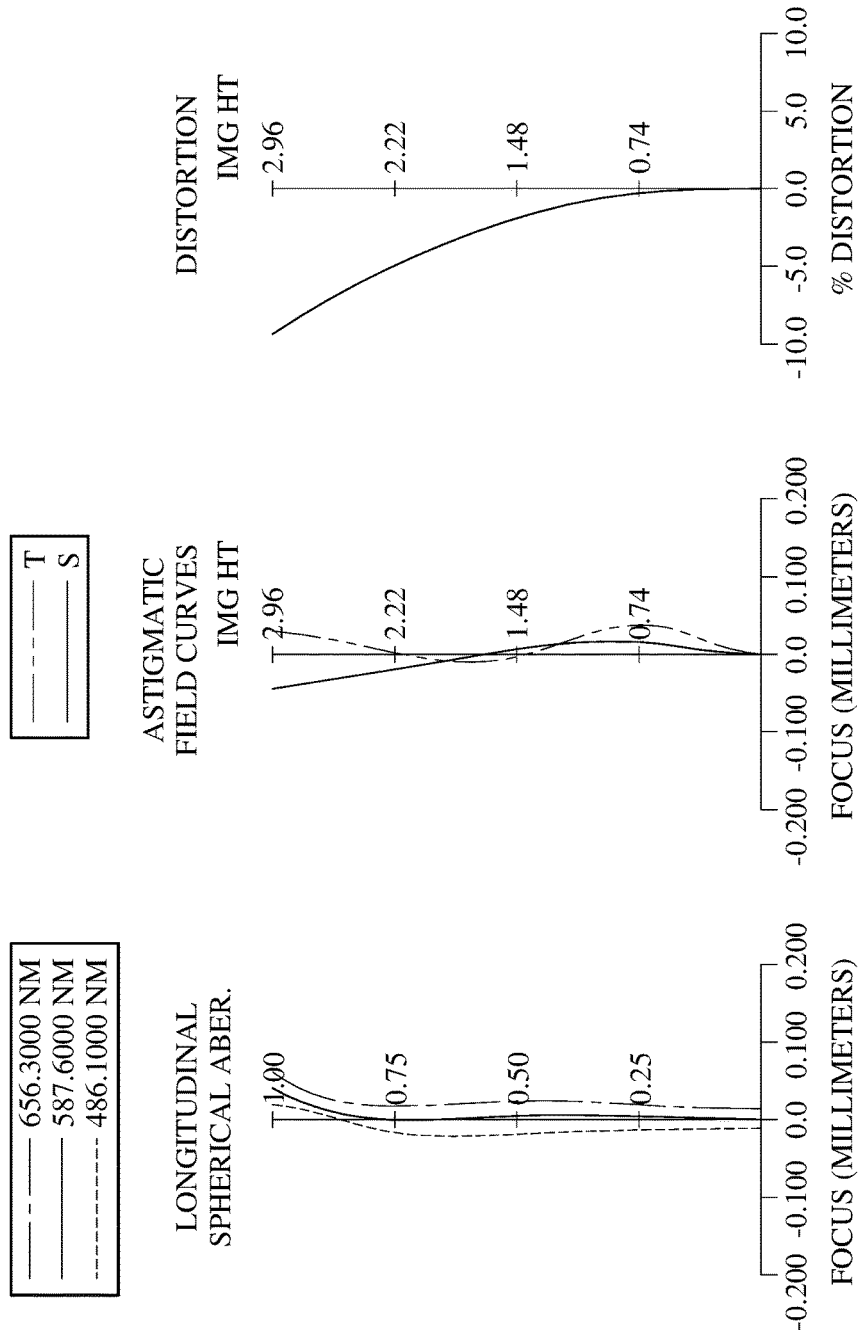
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical photographing lens system (its reference numeral is omitted) of the present disclosure and an image sensor 490. The optical photographing lens system includes, in order from an object side to an image side, a first lens element 410, a second lens element 420, a third lens element 430, an aperture stop 400, a fourth lens element 440, a fifth lens element 450, a filter 460, a cover glass 470 and an image surface 480, wherein the optical photographing lens system has a total of five single and non-cemented lens elements (410-450).

The first lens element 410 with negative refractive power has an object-side surface 411 being convex in a paraxial region thereof and an image-side surface 412 being concave in a paraxial region thereof. The first lens element 410 is made of glass material and has the object-side surface 411 and the image-side surface 412 being both aspheric.

The second lens element 420 with negative refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of glass material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fouth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. Both the object-side surface 451 and the image-side surface 452 have at least one inflection point.

The filter 460 and the cover glass 470 are both made of glass material and located between the fifth lens element 450 and the image surface 480, and will not affect the focal length of the optical photographing lens system.

In this embodiment, a composite focal length of the first lens element 410, the second lens element 420 and the third lens element 430, which are disposed between an imaged object (not shown in the drawings) and the aperture stop 400, is positive value. Specifically, the composite focal length of the first lens element 410, the second lens element 420 and the third lens element 430 is 8.33 mm.

The detailed optical data of the 4th embodiment are shown in Table 7 and the aspheric surface data are shown in Table 8 below.

TABLE 7

4th Embodiment
f = 5.46 mm, Fno = 1.60, HFOV = 31.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 21.118 (ASP) | 1.000 | Glass | 1.624 | 47.1 | −8.18 |
| 2 | | 4.036 (ASP) | 3.165 | | | | |
| 3 | Lens 2 | −6.463 (ASP) | 1.308 | Plastic | 1.639 | 23.5 | −101.74 |
| 4 | | −7.743 (ASP) | 0.156 | | | | |
| 5 | Lens 3 | 34.494 (ASP) | 5.000 | Glass | 1.658 | 50.9 | 7.84 |
| 6 | | −5.721 (ASP) | 0.365 | | | | |
| 7 | Ape. Stop | Plano | 3.169 | | | | |
| 8 | Lens 4 | 16.763 (ASP) | 1.978 | Plastic | 1.534 | 55.9 | 4.22 |
| 9 | | −2.494 (ASP) | 0.229 | | | | |
| 10 | Lens 5 | −1.708 (ASP) | 0.878 | Plastic | 1.639 | 23.5 | −5.36 |
| 11 | | −4.091 (ASP) | 2.011 | | | | |
| 12 | Filter | Plano | 0.550 | Glass | 1.517 | 64.2 | — |
| 13 | | Plano | 0.300 | | | | |
| 14 | cover glass | Plano | 0.400 | Glass | 1.517 | 64.2 | — |
| 15 | | Plano | 3.335 | | | | |
| 16 | Image | Plano | — | | | | |

Note:
Reference wavelength is 587.6 nm (d-line).

TABLE 8

Aspheric Coefficients

| Surface # | | | | |
|---|---|---|---|---|
| 1 | 2 | 3 | 4 | 5 |
| k = −3.2230E+01 | 3.7074E−02 | −5.6011E−01 | 8.3316E−01 | 1.5854E+01 |
| A4 = −1.3490E−03 | −2.3180E−03 | 2.0429E−03 | 4.5016E−03 | 1.3789E−03 |
| A6 = 3.5058E−05 | −9.8229E−05 | −3.3147E−06 | 8.3347E−05 | −3.7333E−05 |

| Surface # | | | | |
|---|---|---|---|---|
| 6 | 8 | 9 | 10 | 11 |
| k = −6.3320E−02 | 5.4452E−01 | −7.9960E+00 | −5.4337E+00 | −2.3438E+01 |
| A4 = 4.6908E−04 | 3.3761E−03 | 3.8903E−03 | 1.5708E−03 | 1.3413E−03 |
| A6 = −2.5934E−06 | −1.4000E−04 | −2.0975E−03 | −1.1097E−03 | 4.0165E−04 |
| A8 = — | 9.0097E−07 | 2.7676E−04 | 1.9045E−04 | −1.4768E−05 |
| A10 = — | 9.2144E−08 | −8.8743E−06 | −6.5813E−06 | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.46 | |(R5 + R6)/(R5 − R6)| | 0.72 |
| Fno | 1.60 | (R7 + R8)/(R7 − R8) | 0.74 |
| HFOV [deg.] | 31.0 | SD/TD | 0.36 |
| tan(HFOV) | 0.60 | SDmax/SDmin | 1.28 |
| V5 | 23.5 | f/R3 + f/R4 | −1.55 |
| (V2 + V5)/2 | 23.49 | f/T34 | 1.55 |
| T12/T34 | 0.90 | f/f1 | −0.67 |
| T45/T34 | 0.06 | f/EPD | 1.60 |
| TD/CT3 | 3.45 | Yp51/f | 0.35 |
| TD/T34 | 4.88 | Yp52/f | 0.22 |
| (T34 * BL)/(T34 + BL) [mm] | 2.30 | |P1| + |P2| | 0.72 |
| BL/ΣAT | 0.93 | — | — |

5th Embodiment

Figure 9:
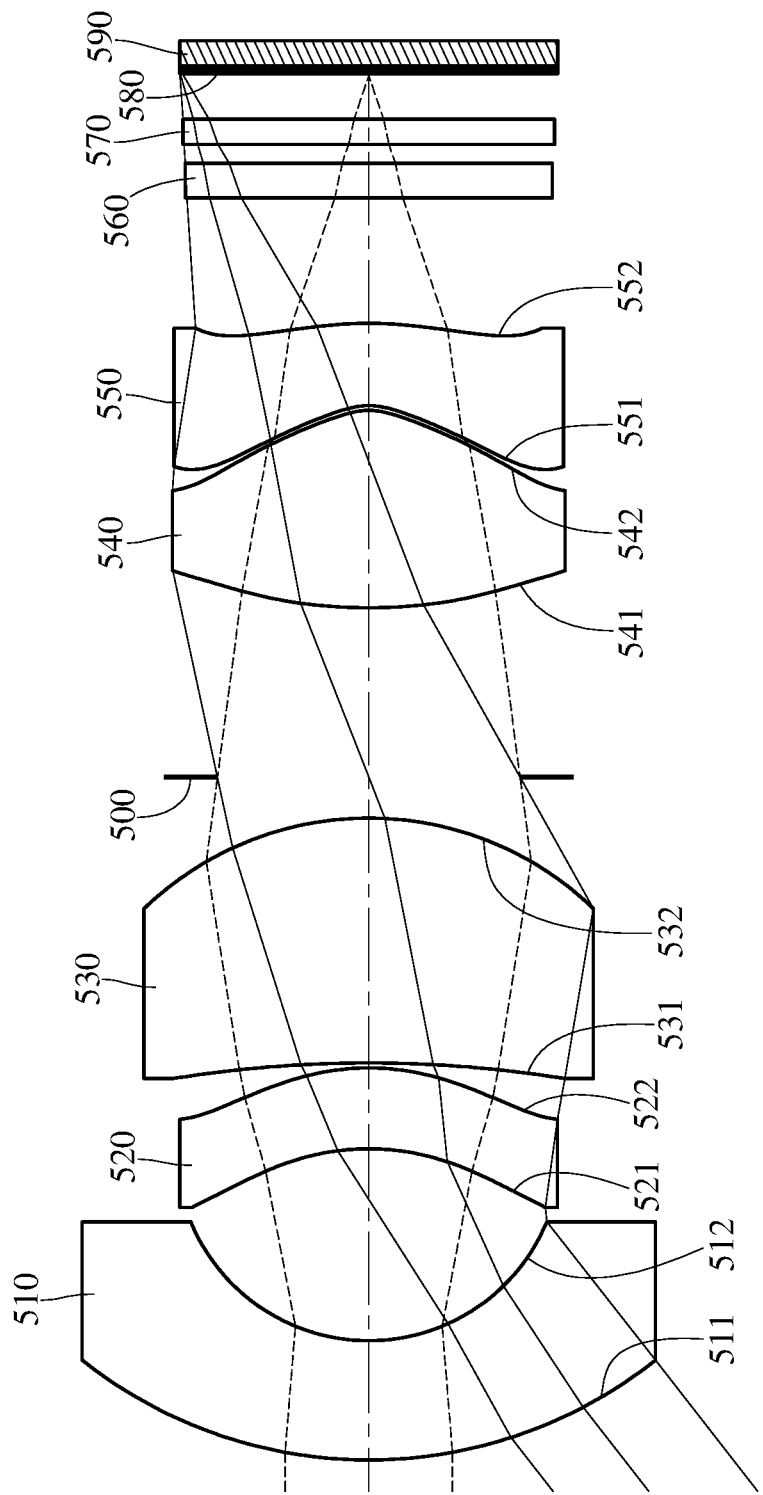
FIG. 9 is a schematic view of an image capturing unit according to the 5th embodiment of the present disclosure.
Figure 10:
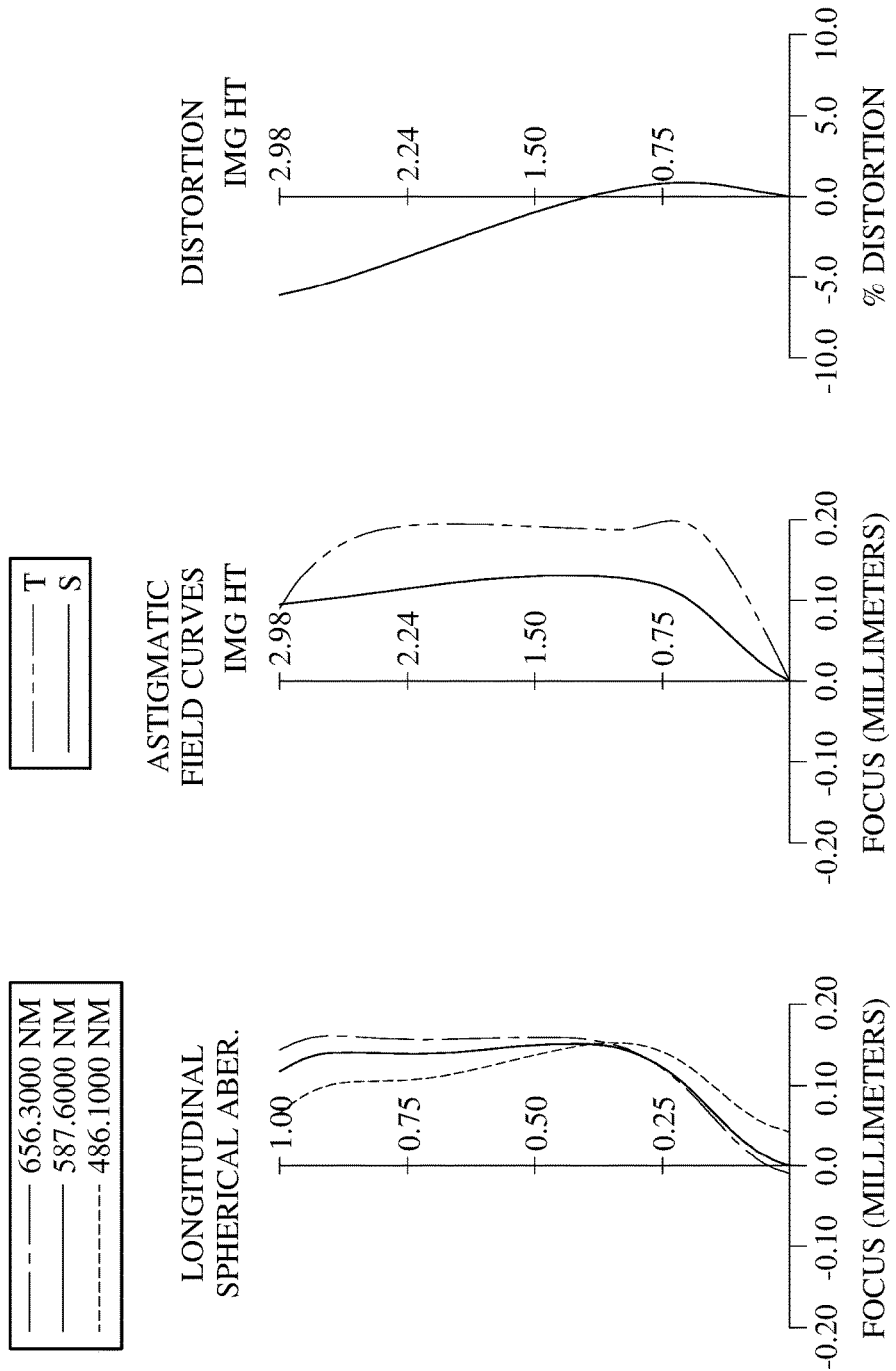
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical photographing lens system (its reference numeral is omitted) of the present disclosure and an image sensor 590. The optical photographing lens system includes, in order from an object side to an image side, a first lens element 510, a second lens element 520, a third lens element 530, an aperture stop 500, a fourth lens element 540, a fifth lens element 550, a filter 560, a cover glass 570 and an image surface 580, wherein the optical photographing lens system has a total of five single and non-cemented lens elements (510-550).

The first lens element 510 with negative refractive power has an object-side surface 511 being convex in a paraxial region thereof and an image-side surface 512 being concave in a paraxial region thereof. The first lens element 510 is made of glass material and has the object-side surface 511 and the image-side surface 512 being both spherical.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of glass material and has the object-side surface 531 and the image-side surface 532 being both spherical.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. Both the object-side surface 551 and the image-side surface 552 have at least one inflection point.

The filter 560 and the cover glass 570 are both made of glass material and located between the fifth lens element 550 and the image surface 580, and will not affect the focal length of the optical photographing lens system.

In this embodiment, a composite focal length of the first lens element 510, the second lens element 520 and the third lens element 530, which are disposed between an imaged object (not shown in the drawings) and the aperture stop 500, is positive value. Specifically, the composite focal length of the first lens element 510, the second lens element 520 and the third lens element 530 is 8.86 mm.

The detailed optical data of the 5th embodiment are shown in Table 9 and the aspheric surface data are shown in Table 10 below.

TABLE 9

5th Embodiment
f = 4.05 mm, Fno = 1.52, HFOV = 37.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 7.338 | 1.900 | Glass | 1.805 | 25.5 | −8.16 |
| 2 | | 3.066 | 3.057 | | | | |
| 3 | Lens 2 | −3.795 (ASP) | 1.287 | Plastic | 1.639 | 23.5 | 50.74 |
| 4 | | −3.846 (ASP) | 0.080 | | | | |
| 5 | Lens 3 | −19.608 | 3.900 | Glass | 1.697 | 48.5 | 9.03 |
| 6 | | −5.156 | 0.651 | | | | |
| 7 | Ape. Stop | Plano | 2.700 | | | | |
| 8 | Lens 4 | 8.380 (ASP) | 3.144 | Plastic | 1.534 | 55.9 | 1.90 |
| 9 | | −1.002 (ASP) | 0.076 | | | | |
| 10 | Lens 5 | −1.022 (ASP) | 1.311 | Plastic | 1.639 | 23.5 | −2.22 |
| 11 | | −5.500 (ASP) | 2.000 | | | | |
| 12 | Filter | Plano | 0.550 | Glass | 1.517 | 64.2 | — |
| 13 | | Plano | 0.300 | | | | |
| 14 | cover glass | Plano | 0.400 | Glass | 1.517 | 64.2 | — |
| 15 | | Plano | 0.727 | | | | |
| 16 | Image | Plano | — | | | | |

Note:
Reference wavelength is 587.6 nm (d-line).

TABLE 10

Aspheric Coefficients

| | Surface # | | |
|---|---|---|---|
| | 3 | 4 | 8 |
| k = | 2.6049E−01 | −3.3353E+00 | 4.3142E+00 |
| A4 = | 8.2030E−04 | −4.0015E−03 | 2.2487E−04 |
| A6 = | 7.1801E−04 | 5.8067E−04 | 2.3093E−04 |
| A8 = | — | — | −9.0602E−05 |
| A10 = | — | — | 4.6184E−06 |

| | Surface # | | |
|---|---|---|---|
| | 9 | 10 | 11 |
| k = | −6.1537E+00 | −6.1623E+00 | −4.2934E+01 |
| A4 = | −2.1233E−03 | −4.5090E−03 | −3.0627E−03 |
| A6 = | −1.2998E−03 | −6.9320E−04 | 8.8081E−04 |
| A8 = | 2.3414E−04 | 2.7980E−04 | 7.7878E−06 |
| A10 = | −9.0121E−06 | −1.3967E−05 | — |

In the 5th embodiment, the equation of the aspheric surface profiles of the aforementioned lens elements is the same as the equation of the 1st embodiment.

Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| | | | |
|---|---|---|---|
| f [mm] | 4.05 | |(R5 + R6)/(R5 − R6)| | 1.71 |
| Fno | 1.52 | (R7 + R8)/(R7 − R8) | 0.79 |
| HFOV [deg.] | 37.9 | SD/TD | 0.40 |
| tan(HFOV) | 0.78 | SDmax/SDmin | 1.65 |
| V5 | 23.5 | f/R3 + f/R4 | −2.12 |
| (V2 + V5)/2 | 23.49 | f/T34 | 1.21 |
| T12/T34 | 0.91 | f/f1 | −0.50 |
| T45/T34 | 0.02 | f/EPD | 1.52 |
| TD/CT3 | 4.64 | Yp51/f | 0.45 |
| TD/T34 | 5.40 | Yp52/f | 0.34 |
| (T34 * BL)/(T34 + BL) [mm] | 1.82 | |P1| + |P2| | 0.58 |
| BL/ΣAT | 0.61 | — | — |

6th Embodiment

Figure 11:
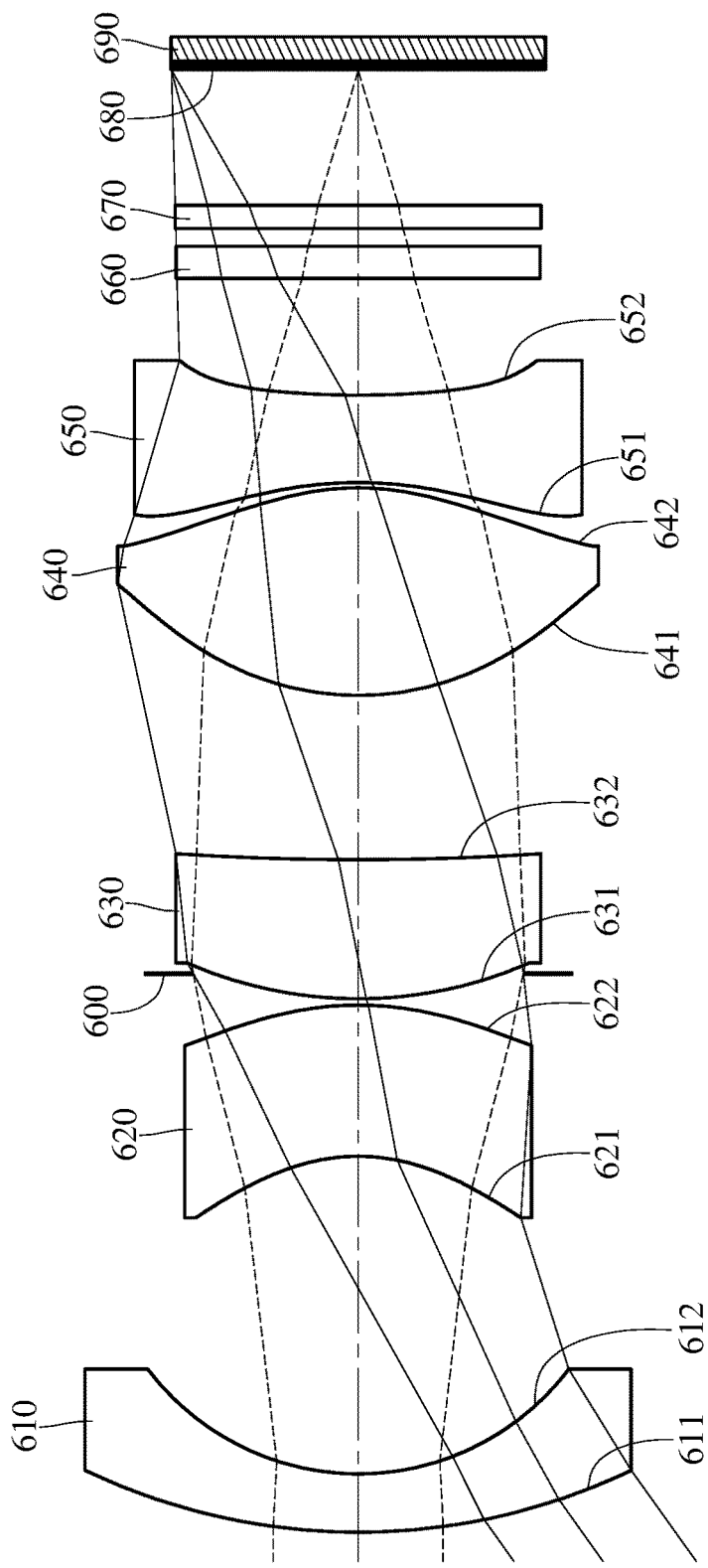
FIG. 11 is a schematic view of an image capturing unit according to the 6th embodiment of the present disclosure.
Figure 12:
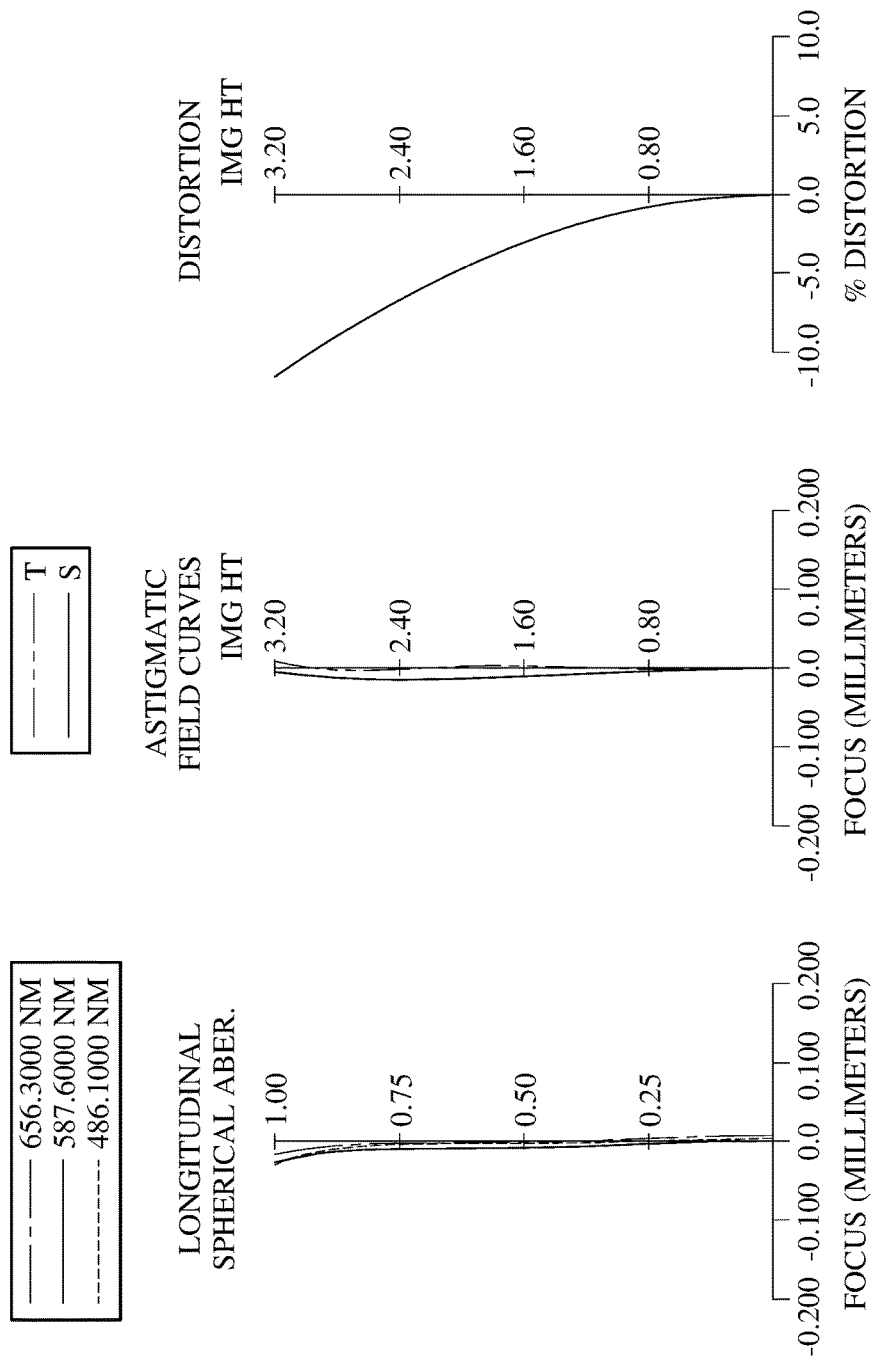
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical photographing lens system (its reference numeral is omitted) of the present disclosure and an image sensor 690. The optical photographing lens system includes, in order from an object side to an image side, a first lens element 610, a second lens element 620, an aperture stop 600, a third lens element 630, a fourth lens element 640, a fifth lens element 650, a filter 660, a cover glass 670 and an image surface 680, wherein the optical photographing lens system has a total of five single and non-cemented lens elements (610-650).

The first lens element 610 with negative refractive power has an object-side surface 611 being convex in a paraxial region thereof and an image-side surface 612 being concave in a paraxial region thereof. The first lens element 610 is made of glass material and has the object-side surface 611 and the image-side surface 612 being both spherical.

The second lens element 620 with negative refractive power has and object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of glass material and has the object-side surface 631 and the image-side surface 632 being both spherical.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The object-side surface 651 has at least one inflection point.

The filter 660 and the cover glass 670 are both made of glass material and located between the fifth lens element 650 and the image surface 680, and will not affect the focal length of the optical photographing lens system.

The detailed optical data of the 6th embodiment are shown in Table 11 and the aspheric surface data are shown in Table 12 below.

TABLE 12-continued

| Aspheric Coefficients | | | |
|---|---|---|---|
| A8 = | −1.1339E−05 | −1.5630E−05 | 1.0305E−05 |
| A10 = | 3.3665E−07 | 5.0819E−07 | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.08 | |(R5 + R6)/(R5 − R6)| | 1.36 |
| Fno | 1.75 | (R7 + R8)/(R7 − R8) | 0.05 |
| HFOV [deg.] | 35.5 | SD/TD | 0.51 |

TABLE 11

6th Embodiment
f = 5.08 mm, Fno = 1.75, HFOV = 35.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 10.807 | 1.000 | Glass | 1.603 | 60.7 | −13.66 |
| 2 | | 4.512 | 5.427 | | | | |
| 3 | Lens 2 | −3.270 (ASP) | 2.579 | Plastic | 1.559 | 40.4 | −25.45 |
| 4 | | −5.447 (ASP) | 0.541 | | | | |
| 5 | Ape. Stop | Plano | −0.431 | | | | |
| 6 | Lens 3 | 7.263 | 2.382 | Glass | 1.603 | 60.7 | 13.90 |
| 7 | | 47.619 | 2.805 | | | | |
| 8 | Lens 4 | 4.951 (ASP) | 3.549 | Plastic | 1.534 | 55.9 | 5.05 |
| 9 | | −4.436 (ASP) | 0.089 | | | | |
| 10 | Lens 5 | −6.820 (ASP) | 1.493 | Plastic | 1.671 | 19.5 | −6.92 |
| 11 | | 15.842 (ASP) | 2.000 | | | | |
| 12 | Filter | Plano | 0.550 | Glass | 1.517 | 64.2 | — |
| 13 | | Plano | 0.300 | | | | |
| 14 | cover glass | Plano | 0.400 | Glass | 1.517 | 64.2 | — |
| 15 | | Plano | 2.321 | | | | |
| 16 | Image | Plano | — | | | | |

Note:
Reference wavelength is 587.6 nm (d-line).

TABLE 12

| Aspheric Coefficients | | | |
|---|---|---|---|
| | | Surface # | |
| | 3 | 4 | 8 |
| k = | −5.5107E−01 | −6.7949E−01 | −2.8242E−01 |
| A4 = | 3.5461E−03 | 1.4807E−03 | 5.5168E−04 |
| A6 = | 6.6307E−05 | 2.6607E−05 | −4.5495E−05 |
| A8 = | — | — | 2.6782E−06 |
| A10 = | — | — | −1.8308E−07 |

| | Surface # | | |
|---|---|---|---|
| | 9 | 10 | 11 |
| k = | −5.1229E+00 | −5.6729E+00 | −9.9000E+01 |
| A4 = | −1.1575E−04 | −1.2436E−03 | 2.2439E−03 |
| A6 = | 1.4559E−04 | 2.9696E−04 | 1.6534E−04 |

| 6th Embodiment | | | |
|---|---|---|---|
| tan(HFOV) | 0.71 | SDmax/SDmin | 1.68 |
| V5 | 19.5 | f/R3 + f/R4 | −2.49 |
| (V2 + V5)/2 | 29.96 | f/T34 | 1.81 |
| T12/T34 | 1.93 | f/f1 | −0.37 |
| T45/T34 | 0.03 | f/EPD | 1.75 |
| TD/CT3 | 8.16 | Yp51/f | 0.45 |
| TD/T34 | 6.93 | Yp52/f | — |
| (T34 * BL)/(T34 + BL) [mm] | 1.87 | |P1| + |P2| | 0.57 |
| BL/ΣAT | 0.66 | — | — |

7th Embodiment

Figure 13:
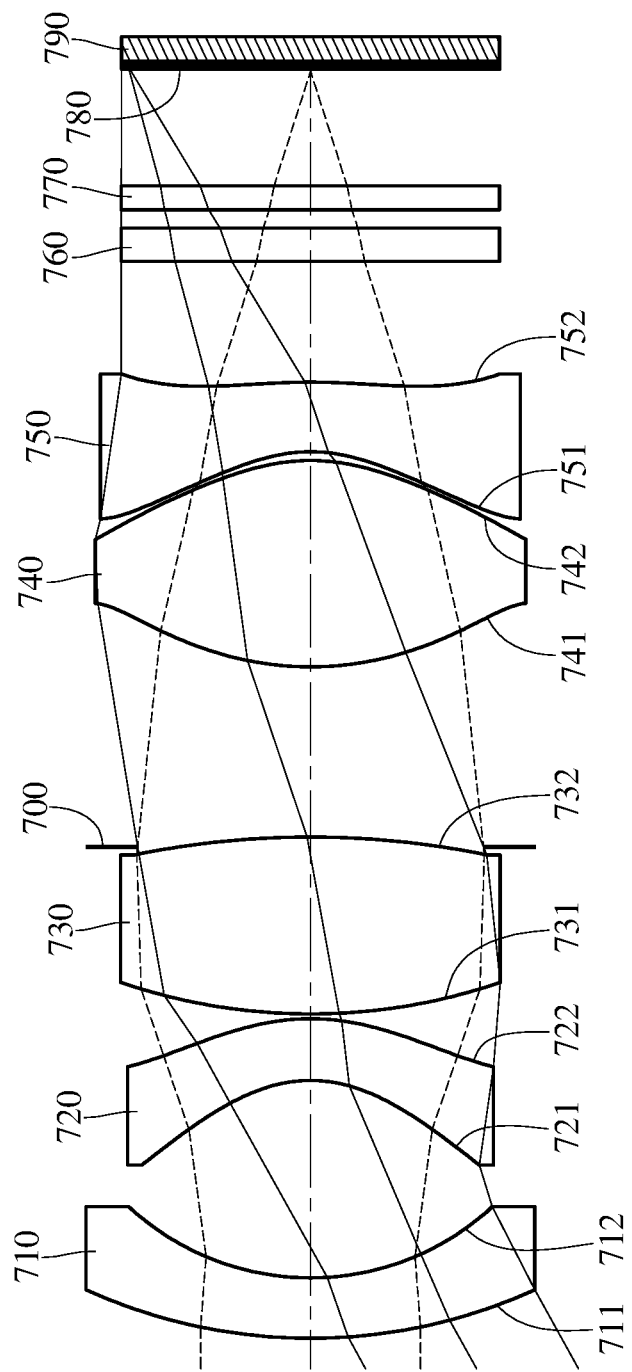
FIG. 13 a schematic view of an image capturing unit according to the 7th embodiment of the present disclosure.
Figure 14:
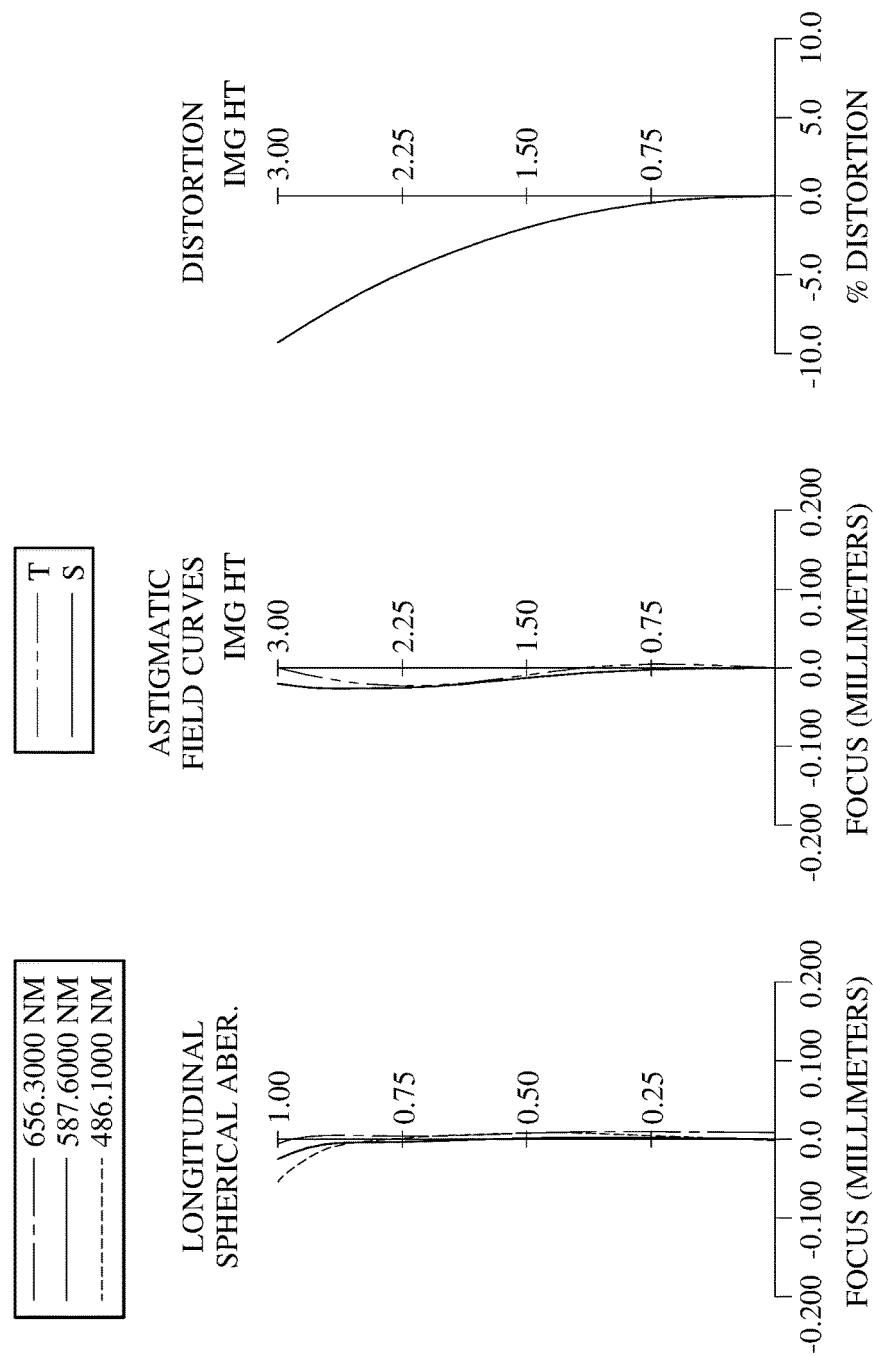
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical photographing lens system (its reference numeral is omitted) of the present disclosure and an image sensor 790. The optical photographing lens system includes, in order from an object side to an image side, a first lens element 710, a second lens element 720, a third lens element 730, an aperture stop 700, a fourth lens element 740, a fifth lens element 750, a filter 760, a cover glass 770 and an image surface 780, wherein the optical photographing lens system has a total of five single and non-cemented lens elements (710-750).

The first lens element 710 with negative refractive power has an object-side surface 711 being convex in a paraxial region thereof and an image-side surface 712 being concave in a paraxial region thereof. The first lens element 710 is made of glass material and has the object-side surface 711 and the image-side surface 712 being both spherical.

The second lens element 720 with negative refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of glass material and has the object-side surface 731 and the image-side surface 732 being both spherical.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. Both the object-side surface 751 and the image-side surface 752 have at least one inflection point.

The filter 760 and the cover glass 770 are both made of glass material and located between the fifth lens element 750 and the image surface 780, and will not affect the focal length of the optical photographing lens system.

In this embodiment, a composite focal length of the first lens element 710, the second lens element 720 and the third lens element 730, which are disposed between an imaged object (not shown in the drawings) and the aperture stop 700, is positive value. Specifically, the composite focal length of the first lens element 710, the second lens element 720 and the third lens element 730 is 21.29 mm.

The detailed optical data of the 7th embodiment are shown in Table 13 and the aspheric surface data are shown in Table 14 below

TABLE 13

7th Embodiment
f = 6.00 mm, Fno = 1.65, HFOV = 28.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 8.966 | 1.000 | Glass | 1.603 | 60.7 | −15.80 |
| 2 | | 4.425 | 3.269 | | | | |
| 3 | Lens 2 | −2.230 (ASP) | 1.021 | Plastic | 1.639 | 23.5 | −11.86 |
| 4 | | −3.724 (ASP) | 0.080 | | | | |
| 5 | Lens 3 | 9.703 | 2.928 | Glass | 1.809 | 45.6 | 7.59 |
| 6 | | −14.482 | −0.164 | | | | |
| 7 | Ape. Stop | Plano | 2.983 | | | | |
| 8 | Lens 4 | 5.239 (ASP) | 3.416 | Plastic | 1.534 | 55.9 | 4.30 |
| 9 | | −3.153 (ASP) | 0.145 | | | | |
| 10 | Lens 5 | −2.487 (ASP) | 1.152 | Plastic | 1.639 | 23.5 | −5.51 |
| 11 | | −10.037 (ASP) | 2.000 | | | | |
| 12 | Filter | Plano | 0.550 | Glass | 1.517 | 64.2 | — |
| 13 | | Plano | 0.300 | | | | |
| 14 | cover glass | Plano | 0.400 | Glass | 1.517 | 64.2 | — |
| 15 | | Plano | 1.928 | | | | |
| 16 | Image | Plano | — | | | | |

Note:
Reference wavelength is 587.6 nm (d-line).

TABLE 14

Aspheric Coefficients

| | Surface # | | |
|---|---|---|---|
| | 3 | 4 | 8 |
| k = | −7.7524E−01 | −9.8799E−01 | −4.4722E−01 |
| A4 = | 8.7774E−03 | 5.2125E−03 | 1.3335E−04 |
| A6 = | — | — | −6.9815E−05 |
| A8 = | — | — | 7.7936E−06 |
| A10 = | — | — | −9.8476E−07 |

| | Surface # | | |
|---|---|---|---|
| | 9 | 10 | 11 |
| k = | −2.8594E+00 | −3.0839E+00 | −4.9262E+01 |
| A4 = | 3.2112E−03 | 4.8022E−03 | 5.9725E−03 |
| A6 = | −3.5269E−04 | −5.2529E−04 | −2.4840E−04 |
| A8 = | 1.2013E−05 | 2.8477E−05 | 9.3492E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.00 | |(R5 + R6)/(R5 − R6)| | 0.20 |
| Fno | 1.65 | (R7 + R8)/(R7 − R8) | 0.25 |
| HFOV [deg.] | 28.9 | SD/TD | 0.49 |
| tan(HFOV) | 0.55 | SDmax/SDmin | 1.33 |
| V5 | 23.5 | f/R3 + f/R4 | −4.30 |
| (V2 + V5)/2 | 23.49 | f/T34 | 2.13 |
| T12/T34 | 1.16 | f/f1 | −0.38 |
| T45/T34 | 0.05 | f/EPD | 1.65 |
| TD/CT3 | 5.41 | Yp51/f | 0.37 |
| TD/T34 | 5.62 | Yp52/f | 0.16 |
| (T34 * BL)/(T34 + BL) [mm] | 1.83 | |P1| + |P2| | 0.89 |
| BL/ΣAT | 0.82 | — | — |

8th Embodiment

Figure 15:
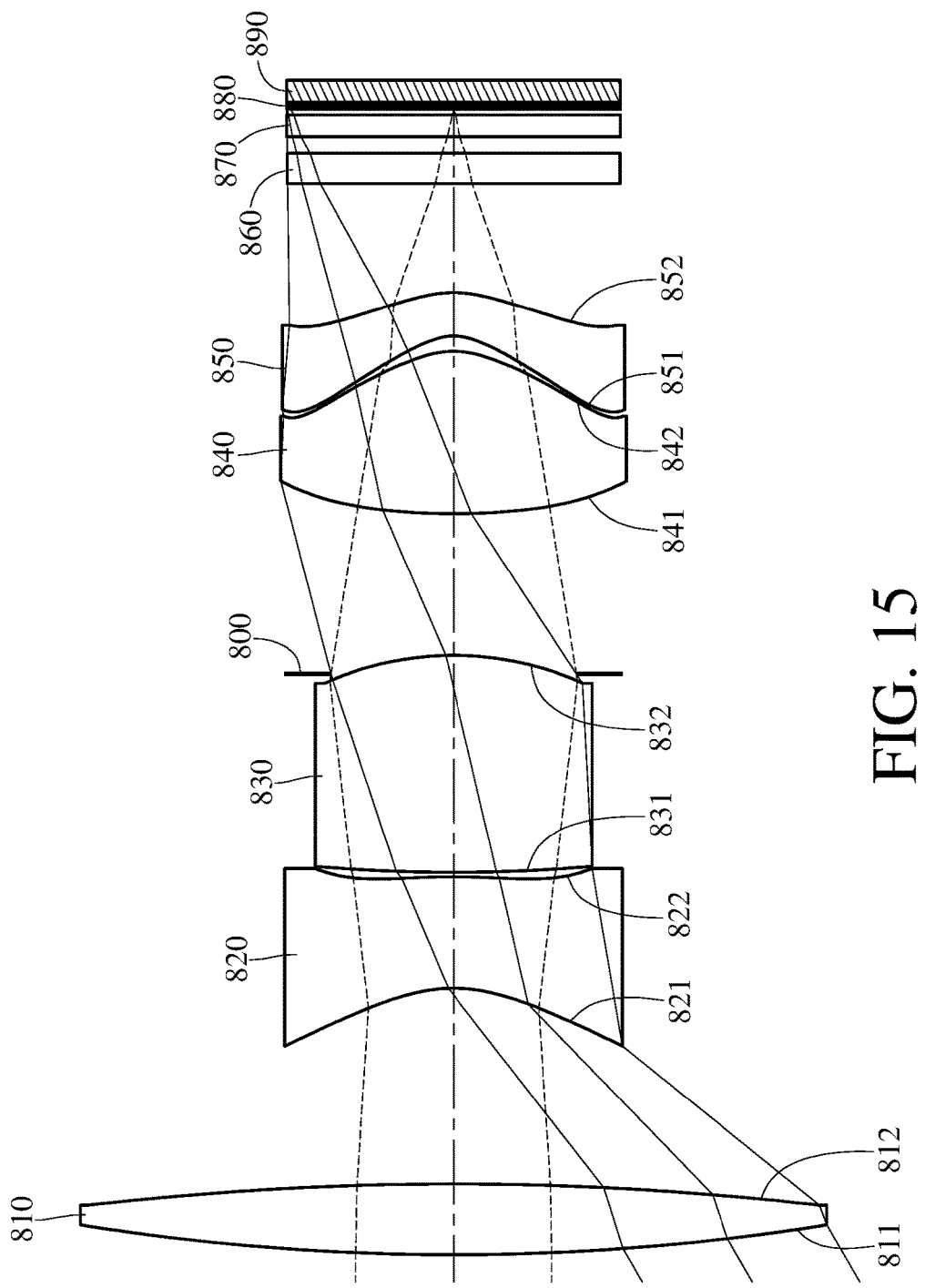
FIG. 15 a schematic view of an image capturing unit according to the 8th embodiment of the present disclosure.
Figure 16:
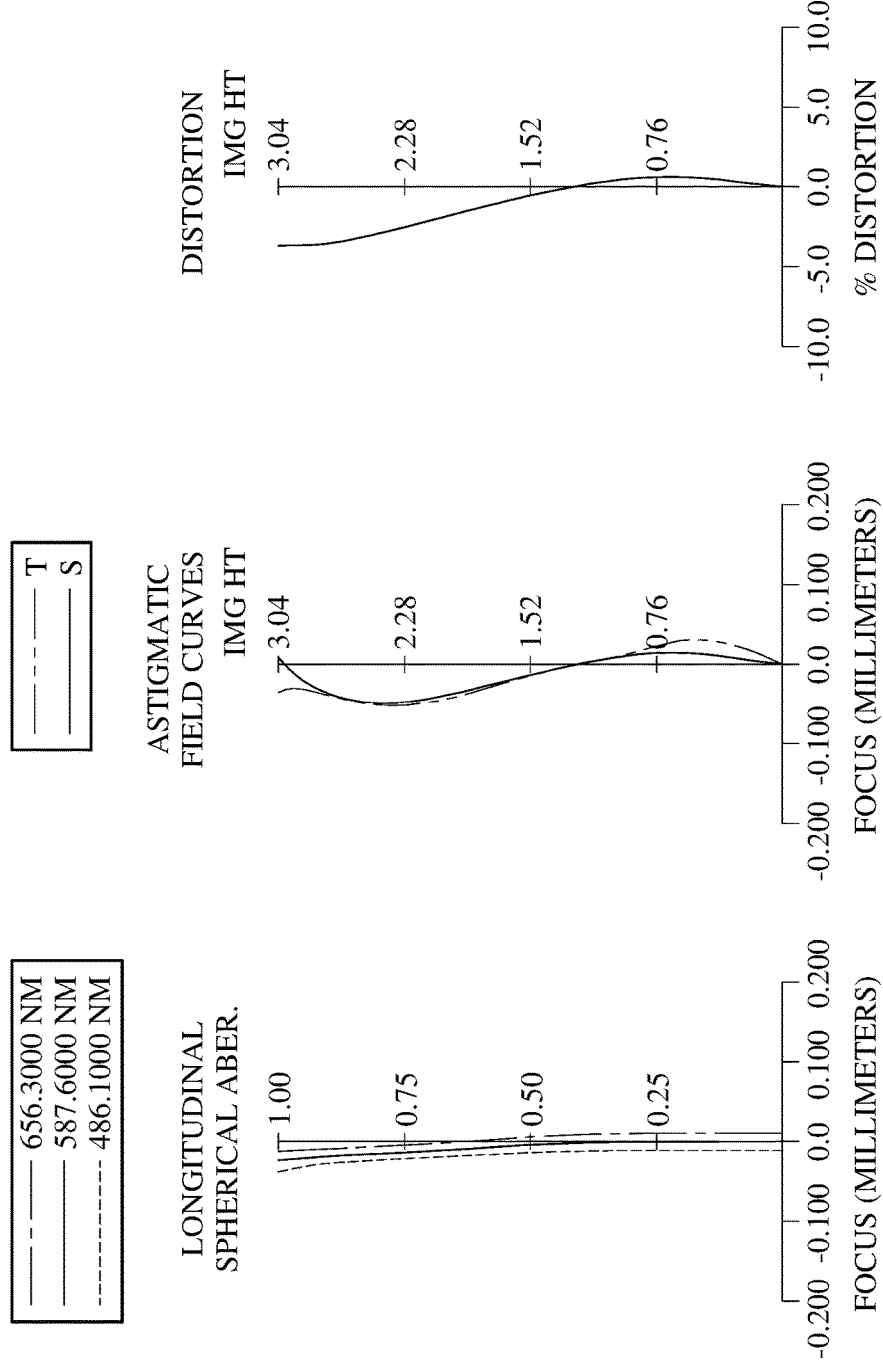
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical photographing lens system (its reference numeral is omitted) of the present disclosure and an image sensor 890. The optical photographing lens system includes, in order from an object side to an image side, a first lens element 810, a second lens element 820, a third lens element 830, an aperture stop 800, a fourth lens element 840, a fifth lens element 850, a filter 860, a cover glass 870 and an image surface 880, wherein the optical photographing lens system has a total of five single and non-cemented lens elements (810-850).

The first lens element 810 with positive refractive power has an object-side surface 811 being convex in a paraxial region thereof and an image-side surface 812 being convex in a paraxial region thereof. The first lens element 810 is made of glass material and has the object-side surface 811 and the image-side surface 812 being both spherical.

The second lens element 820 with negative refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of glass material and has the object-side surface 831 and the image-side surface 832 being both spherical.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. Both the object-side surface 851 and the image-side surface 852 have at least one inflection point.

The filter 860 and the cover glass 870 are both made of glass material and located between the fifth lens element 850 and the image surface 880, and will not affect the focal length of the optical photographing lens system.

In this embodiment, a composite focal length of the first lens element 810, the second lens element 820 and the third lens element 830, which are disposed between an imaged object (not shown in the drawings) and the aperture stop 800, is positive value. Specifically, the composite focal length of the first lens element 810, the second lens element 820 and the third lens element 830 is 9.37 mm.

The detailed optical data of the 8th embodiment are shown in Table 15 and the aspheric surface data are shown in Table 16 below.

TABLE 15

8th Embodiment
f = 5.49 mm, Fno = 1.53, HFOV = 30.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 43.150 | 1.291 | Glass | 1.883 | 40.8 | 28.15 |
| 2 | | −57.808 | 3.592 | | | | |
| 3 | Lens 2 | −2.853 (ASP) | 2.042 | Plastic | 1.639 | 23.5 | −6.41 |
| 4 | | −12.035 (ASP) | 0.080 | | | | |
| 5 | Lens 3 | 29.824 | 3.980 | Glass | 1.834 | 37.3 | 6.05 |
| 6 | | −5.705 | −0.338 | | | | |
| 7 | Ape. Stop | Plano | 2.938 | | | | |
| 8 | Lens 4 | 14.113 (ASP) | 2.973 | Plastic | 1.534 | 55.9 | 2.71 |
| 9 | | −1.491 (ASP) | 0.280 | | | | |
| 10 | Lens 5 | −0.952 (ASP) | 0.800 | Plastic | 1.639 | 23.5 | −4.02 |
| 11 | | −2.007 (ASP) | 2.000 | | | | |
| 12 | Filter | Plano | 0.550 | Glass | 1.517 | 64.2 | — |
| 13 | | Plano | 0.300 | | | | |
| 14 | cover glass | Plano | 0.400 | Glass | 1.517 | 64.2 | — |

TABLE 15-continued

8th Embodiment
f = 5.49 mm, Fno = 1.53, HFOV = 30.0 deg.

| Surface # | | Curvature Radius | Thickness | Material | Index | Abbe # | Focal Length |
|---|---|---|---|---|---|---|---|
| 15 | | Plano | 0.106 | | | | |
| 16 | Image | Plano | — | | | | |

Note:
Reference wavelength is 587.6 nm (d-line).

TABLE 16

Aspheric Coefficients

| Surface # | | | |
|---|---|---|---|
| | 3 | 4 | 8 |
| k = | −2.9974E+00 | 1.1853E+01 | 1.0511E+01 |
| A4 = | 2.6023E−03 | 1.1932E−02 | 2.0596E−03 |
| A6 = | −1.3231E−04 | −7.5370E−05 | 1.2859E−05 |
| A8 = | — | — | −1.3837E−05 |
| A10 = | — | — | 8.9429E−07 |

| Surface # | | | |
|---|---|---|---|
| | 9 | 10 | 11 |
| k = | −4.7531E+00 | −3.3244E+00 | −8.2065E+00 |
| A4 = | −4.8626E−03 | −5.7811E−05 | 1.9934E−04 |
| A6 = | 1.7037E−04 | −6.5332E−04 | 2.4154E−04 |
| A8 = | −6.3155E−06 | 1.2759E−04 | 1.1865E−05 |
| A10 = | 5.0382E−06 | −2.4531E−06 | — |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

8th Embodiment

| | | | |
|---|---|---|---|
| f [mm] | 5.49 | |(R5 + R6)/(R5 − R6)| | 0.68 |
| Fno | 1.53 | (R7 + R8)/(R7 − R8) | 0.81 |
| HFOV [deg.] | 30.0 | SD/TD | 0.40 |
| tan(HFOV) | 0.58 | SDmax/SDmin | 2.90 |
| V5 | 23.5 | f/R3 + f/R4 | −2.38 |
| (V2 + V5)/2 | 23.49 | f/T34 | 2.11 |
| T12/T34 | 1.38 | f/f1 | 0.20 |
| T45/T34 | 0.11 | f/EPD | 1.53 |
| TD/CT3 | 4.43 | Yp51/f | 0.34 |
| TD/T34 | 6.78 | Yp52/f | 0.27 |
| (T34 * BL)/(T34 + BL) [mm] | 1.46 | |P1| + |P2| | 1.05 |
| BL/ΣAT | 0.51 | — | — |

9th Embodiment

Figure 17:
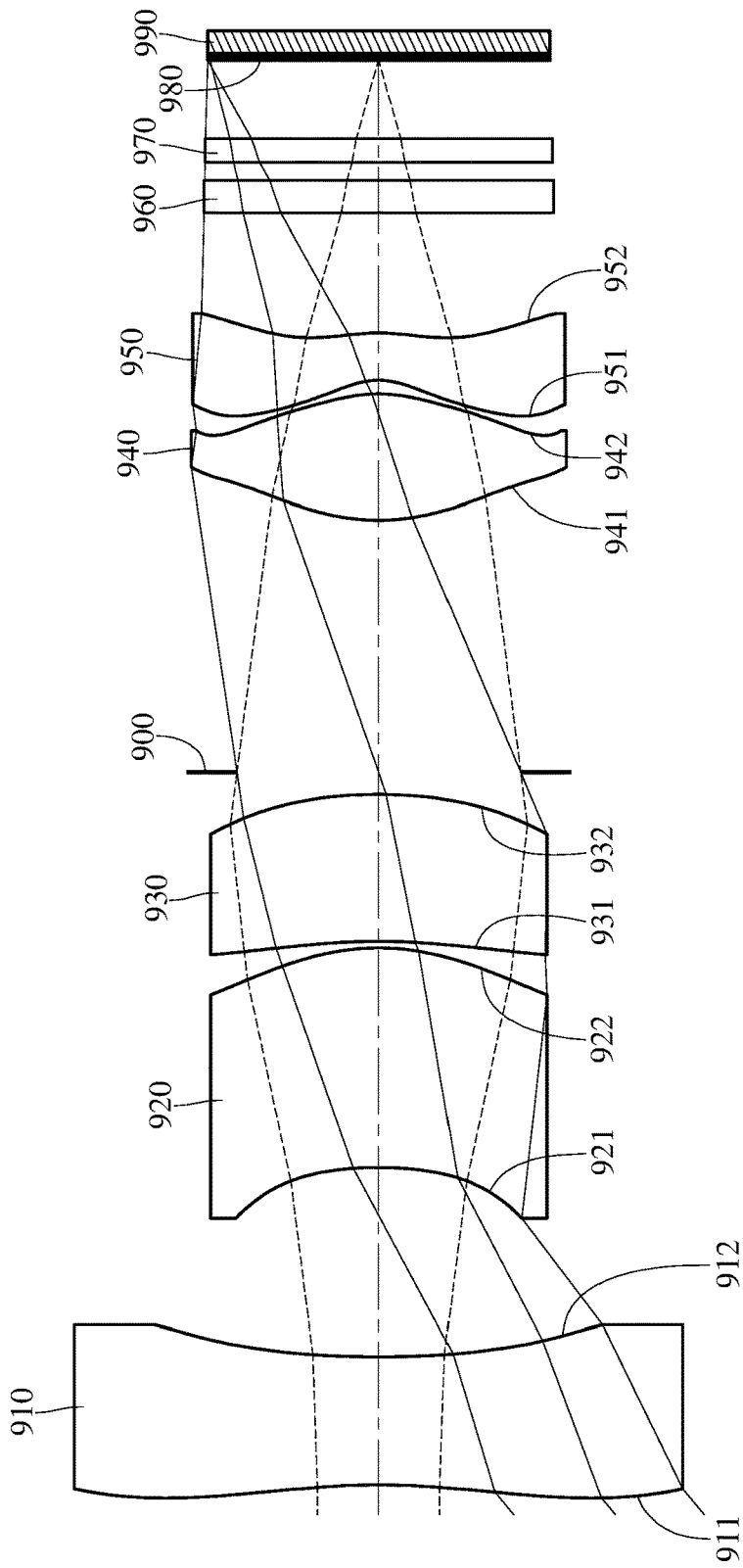
FIG. 17 a schematic view of an image capturing unit according to the 9th embodiment of the present disclosure.
Figure 18:
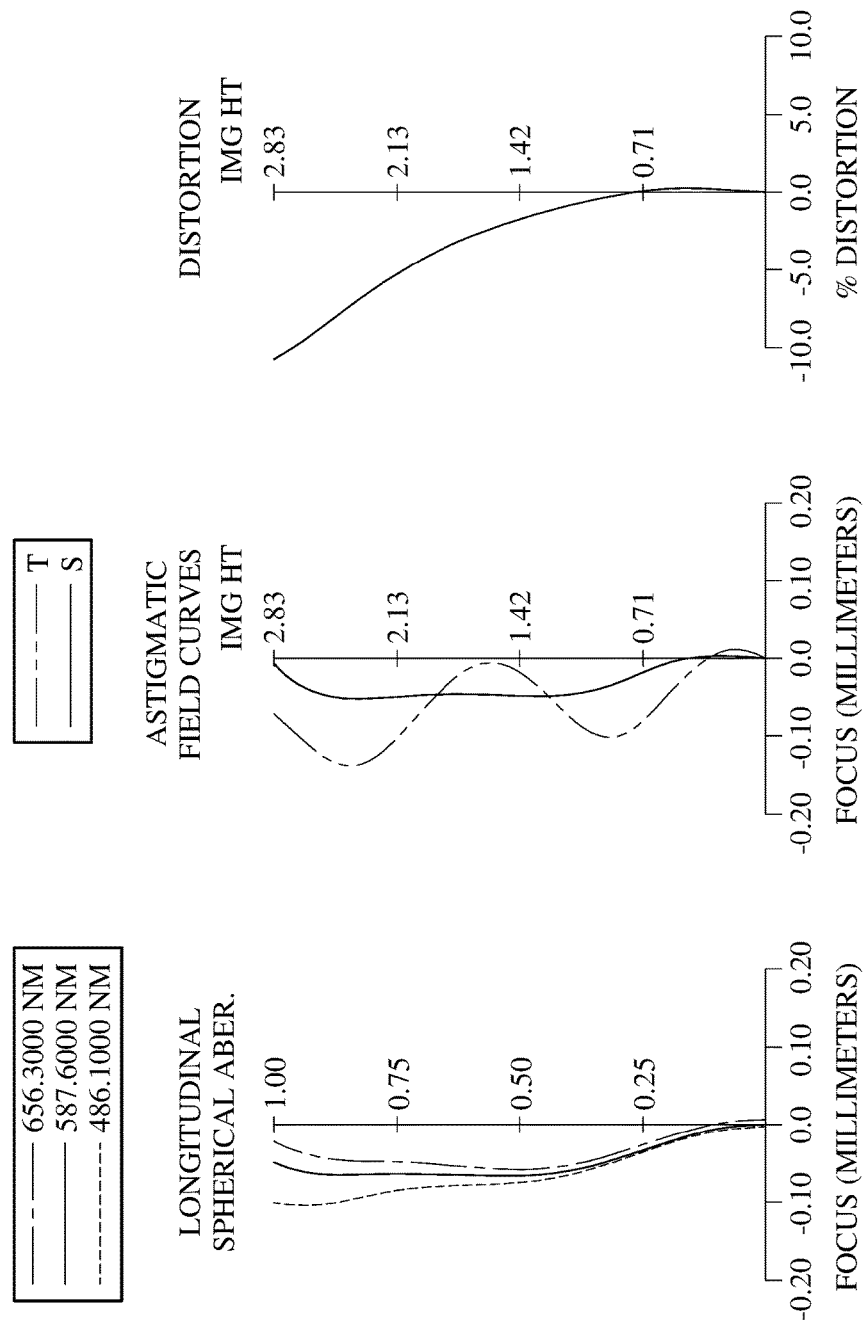
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical photographing lens system (its reference numeral is omitted) of the present disclosure and an image sensor 990. The optical photographing lens system includes, in order from an object side to an image side, a first lens element 910, a second lens element 920, a third lens element 930, an aperture stop 900, a fourth lens element 940, a fifth lens element 950, a filter 960, a cover glass 970 and an image surface 980, wherein the optical photographing lens system has a total of five single and non-cemented lens elements (910-950).

The first lens element 910 with negative refractive power has an object-side surface 911 being concave in a paraxial region thereof and an image-side surface 912 being concave in a paraxial region thereof. The first lens element 910 is made of glass material and has the object-side surface 911 and image-side surface 912 being both aspheric.

The second lens element 920 with positive refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with positive refractive power has an object-side surface 931 being concave in a paraxial region thereof and an image-side surface 932 being convex in a paraxial region thereof. The third lens element is made of glass material and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. Both the object-side surface 951 and the image-side surface 952 have at least one inflection point.

The filter 960 and the cover glass 970 are both made of glass material and located between the fifth lens element 950 and the image surface 980, and will not affect the focal length of the optical photographing lens system.

In this embodiment, a composite focal length of the first lens element 910, the second lens element 920 and the third lens element 930, which are disposed between an imaged object (not shown in the drawings) and the aperture stop 900, is positive value. Specifically, the composite focal length of the first lens element 910, the second lens element 920 and the third lens element 930 is 10.22 mm.

The detailed optical data of the 9th embodiment are shown in Table 17 and the aspheric surface data are shown in Table 18 below.

TABLE 17

9th Embodiment
f = 3.82 mm, Fno = 1.85, HFOV = 40.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −11.934 (ASP) | 2.162 | Glass | 1.883 | 40.8 | −7.80 |
| 2 | | 17.686 (ASP) | 3.187 | | | | |
| 3 | Lens 2 | −6.504 (ASP) | 3.700 | Plastic | 1.544 | 55.9 | 12.32 |
| 4 | | −3.961 (ASP) | 0.110 | | | | |
| 5 | Lens 3 | −10.382 (ASP) | 2.484 | Glass | 1.658 | 50.9 | 31.20 |
| 6 | | −7.551 (ASP) | 0.365 | | | | |
| 7 | Ape. Stop | Plano | 4.250 | | | | |
| 8 | Lens 4 | 3.655 (ASP) | 2.128 | Plastic | 1.534 | 55.9 | 2.93 |
| 9 | | −2.181 (ASP) | 0.230 | | | | |
| 10 | Lens 5 | −1.087 (ASP) | 0.800 | Plastic | 1.639 | 23.5 | −3.35 |
| 11 | | −2.845 (ASP) | 2.015 | | | | |
| 12 | Filter | Plano | 0.550 | Glass | 1.517 | 64.2 | |
| 13 | | Plano | 0.300 | | | | |
| 14 | cover glass | Plano | 0.400 | Glass | 1.517 | 64.2 | |
| 15 | | Plano | 1.323 | | | | |
| 16 | Image | Plano | — | | | | |

Note:
Reference wavelength is 587.6 nm (d-line).

TABLE 18

Aspheric Coefficients

| | Surface # | | | | |
|---|---|---|---|---|---|
| | 1 | 2 | 3 | 4 | 5 |
| k = | −3.6424E+01 | 1.7109E+01 | −3.5556E−01 | −2.7786E−01 | −9.2679E−02 |
| A4 = | 8.3097E−04 | 1.1327E−03 | −1.1848E−02 | 4.5001E−03 | 3.6104E−03 |
| A6 = | −5.5357E−06 | −2.0941E−04 | −4.7834E−06 | 8.3893E−05 | −1.3294E−04 |
| A8 = | 3.5969E−07 | 2.1132E−05 | — | — | — |
| A10 = | −9.9096E−09 | −8.9367E−07 | — | — | — |

| | Surface # | | | | |
|---|---|---|---|---|---|
| | 6 | 8 | 9 | 10 | 11 |
| k = | 1.5445E+00 | −1.9243E+00 | −9.8114E+00 | −4.5284E+00 | −2.2476E+01 |
| A4 = | −1.9589E−03 | 8.0769E−04 | 4.4690E−03 | 3.2456E−02 | 4.6968E−02 |
| A6 = | 7.6693E−05 | −8.7360E−04 | −2.1113E−03 | −7.0952E−03 | −8.7426E−03 |
| A8 = | — | 4.4401E−08 | 2.2659E−04 | 7.9468E−04 | 7.6179E−04 |
| A10 = | — | 4.9933E−06 | −3.0508E−06 | −3.0929E−05 | −2.6658E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.82 | |(R5 + R6)/(R5 − R6)| | 6.34 |
| Fno | 1.85 | (R7 + R8)/(R7 − R8) | 0.25 |
| HFOV [deg.] | 40.0 | SD/TD | 0.38 |
| tan(HFOV) | 0.84 | SDmax/SDmin | 2.13 |
| V5 | 23.5 | f/R3 + f/R4 | −1.55 |
| (V2 + V5)/2 | 39.71 | f/T34 | 0.83 |
| T12/T34 | 0.69 | f/f1 | −0.49 |
| T45/T34 | 0.05 | f/EPD | 1.85 |
| TD/CT3 | 7.82 | Yp51/f | 0.21 |
| TD/T34 | 4.21 | Yp52/f | 0.14 |
| (T34 * BL)/(T34 + BL) [mm] | 2.30 | |P1| + |P2| | 0.80 |
| BL/ΣAT | 0.56 | — | — |

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens system comprising, in order from an object side to an image side:
   a first lens element;
   a second lens element having an object-side surface being concave in a paraxial region thereof and an image-side surface being convex in a paraxial region thereof;
   a third lens element having positive refractive power;
   a fourth lens element having positive refractive power; and
   a fifth lens element having negative refractive power, wherein either an object-side surface of the fifth lens element, an image-side surface of the fifth lens element or both have at least one inflection point;
   wherein the optical photographing lens system has a total of five lens elements, a focal length of the optical photographing lens system is f, a refractive power of the first lens element is P1, a refractive power of the second lens element is P2, an axial distance between an object-side surface of the first lens element and the image-side surface of the fifth lens element is TD, an axial distance between the third lens element and the fourth lens element is T34, a curvature radius of the object-side surface of the second lens element is R3, a curvature radius of the image-side surface of the second lens element is R4, a central thickness of the third lens element is CT3, and the following conditions are satisfied:

$f/R3+f/R4<-1.30$;

$|P1|+|P2|<1.80$;

$2.0<TD/CT3<11.5$; and $0<f/T34<5.0$.

2. The optical photographing lens system of claim 1, wherein the focal length of the optical photographing lens system is f, a focal length of the first lens element is f1, and the following condition is satisfied:

$-0.67<f/f1<0.50$.

3. The optical photographing lens system of claim 1, wherein the focal length of the optical photographing lens system is f, the axial distance between the third lens element and the fourth lens element is T34, the curvature radius of the object-side surface of the second lens element is R3, the curvature radius of the image-side surface of the second lens element is R4, and the following conditions are satisfied:

$0<f/T34<3.50$; and $-7.50<f/R3+f/R4\leq-1.75$.

4. The optical photographing lens system of claim 1, wherein the refractive power of the first lens element is P1, the refractive power of the second lens element is P2, and the following condition is satisfied:

$|P1|+|P2|<1.20$.

5. The optical photographing lens system of claim 1, wherein the axial distance between the third lens element and the fourth lens element is T34, an axial distance between the image-side surface of the fifth lens element and an image surface is BL, and the following condition is satisfied:

$0.60\ [mm]<(T34*BL)/(T34+BL)<3.50\ [mm]$.

6. The optical photographing lens system of claim 1, wherein a maximum value among all maximum effective radii of all surfaces of the lens elements of the optical photographing lens system is SDmax, a minimum value among all maximum effective radii of all surfaces of the lens elements of the optical photographing lens system is SDmin, and the following condition is satisfied:

$1.0<SDmax/SDmin<2.50$.

7. The optical photographing lens system of claim 1, wherein the focal length of the optical photographing lens system is f, an entrance pupil diameter of the optical photographing lens system is EPD, and the following condition is satisfied:

$0.85<f/EPD<3.0$.

8. The optical photographing lens system of claim 1, wherein an Abbe number of the second lens element is V2, an Abbe number of the fifth lens element is V5, and the following condition is satisfied:

$0<(V2+V5)/2<32.0$.

9. The optical photographing lens system of claim 1, wherein at least three of the lens elements of the optical photographing lens system are made of plastic material; half of a maximum field of view of the optical photographing lens system is HFOV, and the following condition is satisfied:

$\tan(HFOV)<1.50$.

10. The optical photographing lens system of claim 1, further comprising an aperture stop disposed between the second lens element and an image surface.

11. The optical photographing lens system of claim 10, wherein a composite focal length of the lens elements disposed between an imaged object and the aperture stop is positive value.

12. The optical photographing lens system of claim 1, wherein the focal length of the optical photographing lens system is f, a vertical distance between the at least one inflection point on the object-side surface of the fifth lens element closest to an optical axis and the optical axis is Yp51, a vertical distance between the at least one inflection point on the image-side surface of the fifth lens element closest to the optical axis and the optical axis is Yp52, and the following conditions are satisfied:

$0.1<Yp51/f<2.0$; and $0.1<Yp52/f<2.0$.

13. An optical photographing lens system, comprising, in order from an object side to an image side:
   a first lens element;
   a second lens element having an object-side surface being concave in a paraxial region thereof and an image-side surface being convex in a paraxial region thereof;
   a third lens element having positive refractive power;
   a fourth lens element having positive refractive power; and
   a fifth lens element having negative refractive power, wherein either an object-side surface of the fifth lens element, an image-side surface of the fifth lens element or both have at least one inflection point;

wherein the optical photographing lens system has a total of five lens elements, the optical photographing lens system further comprises an aperture stop; a focal length of the optical photographing lens system is f, a refractive power of the first lens element is P1, a refractive power of the second lens element is P2, an axial distance between the aperture stop and the image-side surface of the fifth lens element is SD, an axial distance between the object-side surface of the first lens element and the image-side surface of the fifth lens element is TD, an axial distance between the third lens element and the fourth lens element is T34, a curvature radius of the object-side surface of the second lens element is R3, a curvature radius of the image-side surface of the second lens element is R4, and the following conditions are satisfied:

$f/R3+f/R4<-1.0;$ $|P1|+|P2|<1.80;$ $SD/TD<0.60;$ and $2.0<TD/T34<10.0.$

14. The optical photographing lens system of claim 13, wherein the fourth lens element has an object-side surface being convex in a paraxial region thereof.

15. The optical photographing lens system of claim 13, wherein the axial distance between the object-side surface of the first lens element and the image-side surface of the fifth lens element is TD, the axial distance between the third lens element and the fourth lens element is T34, and the following condition is satisfied:

$3.50<TD/T34<9.0.$

16. The optical photographing lens system of claim 13, wherein the axial distance between the third lens element and the fourth lens element is T34, an axial distance between the fourth lens element and the fifth lens element is T45, and the following condition is satisfied:

$0.02<T45/T34<0.25.$

17. The optical photographing lens system of claim 13, wherein the focal length of the optical photographing lens system is f, an entrance pupil diameter of the optical photographing lens system is EPD, and the following condition is satisfied:

$0.85<f/EPD<2.50.$

18. The optical photographing lens system of claim 13, wherein an axial distance between the first lens element and the second lens element is T12, the axial distance between the third lens element and the fourth lens element is T34, and the following condition is satisfied:

$0.60<T12/T34<2.85.$

19. The optical photographing lens system of claim 13, wherein the focal length of the optical photographing lens system is f, the axial distance between the third lens element and the fourth lens element is T34, and the following condition is satisfied:

$0<f/T34<3.50.$

20. The optical photographing lens system of claim 13, wherein an Abbe number of the second lens element is V2, an Abbe number of the fifth lens element is V5, and the following condition is satisfied:

$0<(V2+V5)/2<25.0.$

21. The optical photographing lens system of claim 13, wherein at least three of the lens elements of the optical photographing lens system are made of plastic material, and each surface of the at least three lens elements is aspheric; a curvature radius of an object-side surface of the fourth lens element is R7, a curvature radius of an image-side surface of the fourth lens element is R8, and the following condition is satisfied:

$-1.0<(R7+R8)/(R7-R8)<2.0.$

22. The optical photographing lens system of claim 13, wherein the focal length of the optical photographing lens system is f, a vertical distance between the at least one inflection point on the object-side surface of the fifth lens element closest to an optical axis and the optical axis is Yp51, a vertical distance between the at least one inflection point on the image-side surface of the fifth lens element closest to the optical axis and the optical axis is Yp52, and the following conditions are satisfied:

$0.1<Yp51/f<2.0;$ and $0.1<Yp52/f<2.0.$

23. An image capturing unit, comprising:
the optical photographing lens system of claim 13; and
an image sensor disposed on an image surface of the optical photographing lens system.

24. An electronic device, comprising:
the image capturing unit of claim 23.

25. An optical photographing lens system, comprising, in order from an object side to an image side:
a first lens element;
a second lens element having an object-side surface being concave in a paraxial region thereof and an image-side surface being convex in a paraxial region thereof;
a third lens element having positive refractive power;
a fourth lens element having positive refractive power; and
a fifth lens element having negative refractive power;
wherein the optical photographing lens system has a total of five lens elements;
wherein a focal length of the optical photographing lens system is f, a refractive power of the first lens element is P1, a refractive power of the second lens element is P2, an axial distance between the third lens element and the fourth lens element is T34, an axial distance between the image-side surface of the fifth lens element and an image surface is BL, a curvature radius of the object-side surface of the second lens element is R3, a curvature radius of the image-side surface of the second lens element is R4, and the following conditions are satisfied:

$f/R3+f/R4\leq-1.55;$ $|P1|+|P2|<1.80;$ and $1.0\ [\text{mm}]<(T34*BL)/(T34+BL)<3.0\ [\text{mm}].$ 26. The optical photographing lens system of claim 25, wherein the second lens element has negative refractive power, the refractive power of the first lens element is P1, the refractive power of the second lens element is P2, and the following condition is satisfied:

$|P1|+|P2|<1.40.$

27. The optical photographing lens system of claim 25, wherein the axial distance between the third lens element and the fourth lens element is T34, the axial distance between the image-side surface of the fifth lens element and the image surface is BL, and the following condition is satisfied:

1.70 [mm]<(T34*BL)/(T34+BL)<2.80 [mm].

28. The optical photographing lens system of claim 25, wherein an axial distance between the first lens element and the second lens element is T12, the axial distance between the third lens element and the fourth lens element is T34, and the following condition is satisfied:

0.55<T12/T34<3.45.

29. The optical photographing lens system of claim 25, wherein the axial distance between the image-side surface of the fifth lens element and the image surface is BL, a sum of axial distances between each adjacent lens element of the optical photographing lens system is EAT, and the following condition is satisfied:

0<BL/ΣAT<1.50.

30. The optical photographing lens system of claim 25, wherein the focal length of the optical photographing lens system is f, the axial distance between the third lens element and the fourth lens element is T34, and the following condition is satisfied:

0<f/T34<2.50.

31. The optical photographing lens system of claim 25, wherein each of the lens elements of the optical photographing lens system is a single and non-cemented lens element, an Abbe number of the fifth lens element is V5, a curvature radius of an object-side surface of the third lens element is R5, a curvature radius of an image-side surface of the third lens element is R6, and the following conditions are satisfied:

0<V5<25.0; and

|(R5+R6)/(R5−R6)|<9.50.

32. The optical photographing lens system of claim 25, wherein either an object-side surface of the fifth lens element, an image-side surface of the fifth lens element or both have at least one inflection point, the focal length of the optical photographing lens system is f, an entrance pupil diameter of the optical photographing lens system is EPD, and the following condition is satisfied:

0.85<f/EPD<2.0.

* * * * *